(12) United States Patent
Hedberg

(10) Patent No.: US 11,093,473 B2
(45) Date of Patent: Aug. 17, 2021

(54) HIERARCHICAL TREE DATA STRUCTURES AND USES THEREOF

(71) Applicant: QLIKTECH INTERNATIONAL AB, Lund (SE)

(72) Inventor: Christoffer Hedberg, Lund (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 44 days.

(21) Appl. No.: 16/392,279

(22) Filed: Apr. 23, 2019

(65) Prior Publication Data
US 2019/0324953 A1 Oct. 24, 2019

Related U.S. Application Data

(60) Provisional application No. 62/661,321, filed on Apr. 23, 2018.

(51) Int. Cl.
*G06F 16/22* (2019.01)

(52) U.S. Cl.
CPC ...... *G06F 16/2246* (2019.01); *G06F 16/2264* (2019.01)

(58) Field of Classification Search
CPC ....... G06F 16/254; G06F 16/283; G06F 16/22
USPC ........................................................ 707/797
See application file for complete search history.

(56) References Cited

U.S. PATENT DOCUMENTS

| | | | |
|---|---|---|---|
| 2009/0259679 A1 | 10/2009 | Thiesson | |
| 2011/0040697 A1* | 2/2011 | Constantinou | G06Q 10/067 705/348 |
| 2011/0261049 A1* | 10/2011 | Cardno | G06Q 10/10 345/419 |
| 2012/0001918 A1* | 1/2012 | Sankaraswami | G06T 11/206 345/440 |
| 2015/0242446 A1 | 8/2015 | Stolte et al. | |

OTHER PUBLICATIONS

European Search Report dated Aug. 7, 2019 by the European Patent Office for EP Application No. 19170644.9, (Applicant—Qlik Tech International AB) (10 pages).

* cited by examiner

*Primary Examiner* — Hung T Vy
(74) *Attorney, Agent, or Firm* — Ballard Spahr LLP

(57) ABSTRACT

Methods and systems are disclosed for generating and using a hierarchical tree data structure. A computing device may receive data having a number of dimensions and corresponding values for each of the dimensions. A hierarchical tree data structure may have a root node and a number of levels, one of which may be connected to the root node. Each level may correspond to a respective dimension of the data and may be connected to a higher level as well as to a lower level. A measure for a given dimension may be evaluated based on the nodes corresponding to the level that corresponds to the given dimension and all preceding connected nodes. A result of the measure may be stored in a number of nodes corresponding to the level that corresponds to the given dimension.

20 Claims, 25 Drawing Sheets

FIG. 4

| Client | Year | Sum (Number * Price) |
|---|---|---|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

**Sum (Number * Price) Per Client, Year**

|  | 1999 | <NULL> | <ALL> |
|---|---|---|---|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

| Client | Product | Number | Sum(Quantity)*Sum(Price) |
|---|---|---|---|
| Nisse | Toothpaste | 3 | 39 |
| Gullan | Soap | 5 | 37.5 |
| Kalle | Soap | 8 | 60 |
| Kalle | Shampoo | 2 | - |
| Pekka | Soap | 10 | 75 |
| Nisse | Shampoo | 2 | - |

Table 8

FIG. 6A

| City | Company | Year | Sales |
|---|---|---|---|
| Sthlm | A | 2010 | 4 |
| Sthlm | A | 2011 | 6 |
| Sthlm | B | 2010 | 6 |
| Sthlm | B | 2011 | 6 |
| Malmö | A | 2010 | 10 |
| Malmö | A | 2011 | 4 |
| Malmö | B | 2010 | 7 |
| Malmö | B | 2011 | 1 |

Table 9

FIG. 6B

| City |
|---|
| Sthlm |
| Malmö |

÷

| Company |
|---|
| A |
| B |

=

| City | Company |
|---|---|
| Sthlm | A |
| Sthlm | B |
| Malmö | A |
| Malmö | B |

Table 10

FIG. 6C

Data table

| | |
|---|---|
| Sthlm | A |
| Sthlm | B |
| Malmö | A |
| Malmö | B |

+ Sum(Sales) =

Data table

| City | Company | Sum(Sales) |
|---|---|---|
| Sthlm | A | 10 |
| Sthlm | B | 12 |
| Malmö | A | 14 |
| Malmö | B | 8 |

Table 11

FIG. 11A
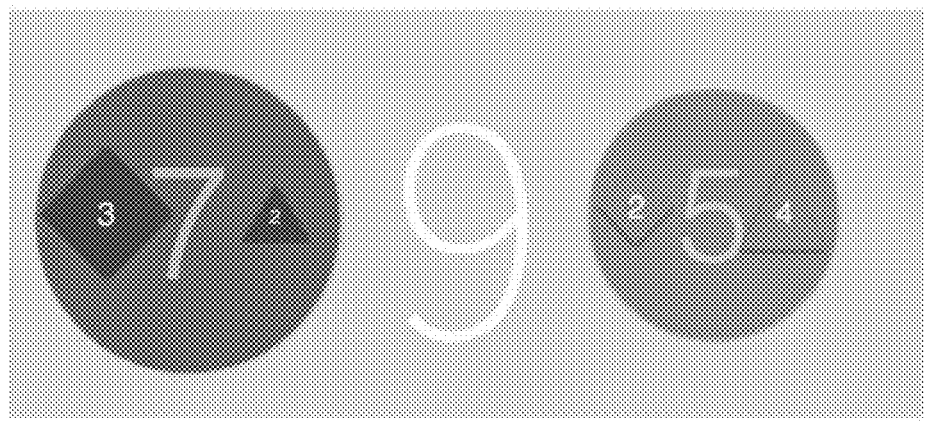
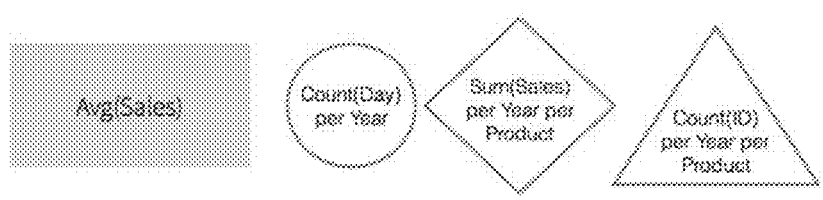
FIG. 11B
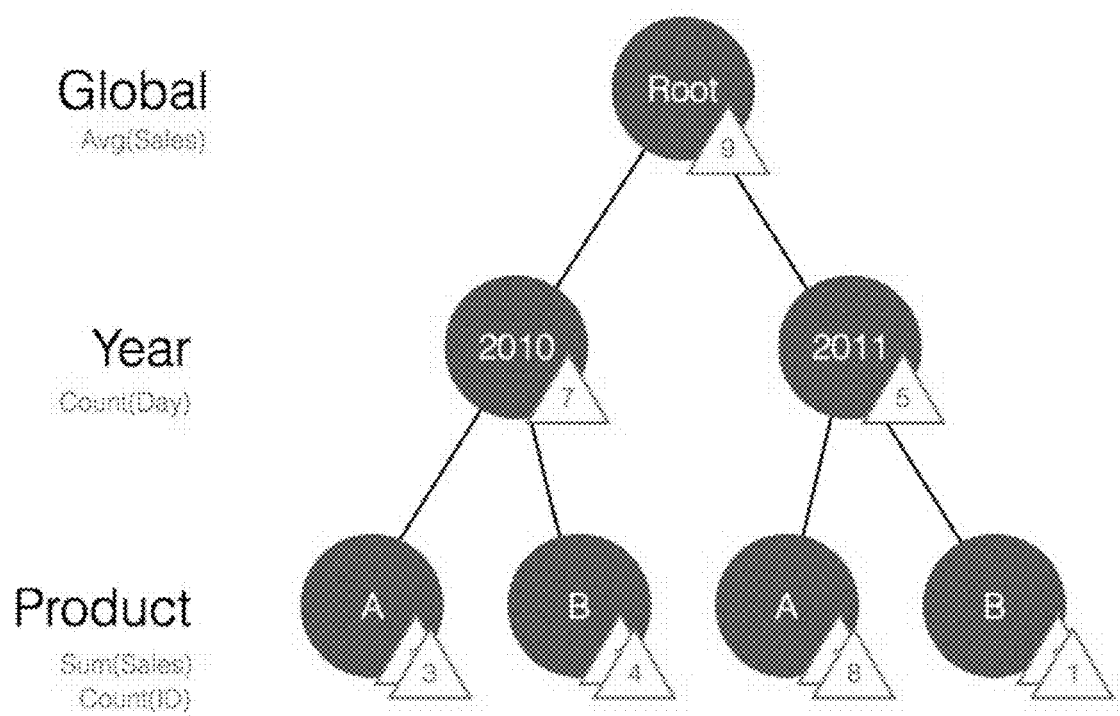

HIERARCHICAL TREE DATA STRUCTURES AND USES THEREOF

CROSS REFERENCE TO RELATED PATENT APPLICATION

This application claims priority to U.S. application Ser. No. 62/661,321, filed on Apr. 23, 2018, which is herein incorporated by reference in its entirety.

SUMMARY

It is to be understood that both the following general description and the following detailed description are exemplary and explanatory only and are not restrictive, as claimed. Methods and systems are disclosed for generating and using a hierarchical tree data structure. A computing device may receive data having a number of dimensions and corresponding values for each of the dimensions. A root node for a hierarchical tree data structure may be determined by the computing device. The hierarchical tree data structure may have a number of levels, one of which may be connected to the root node. Each level of the hierarchical tree data structure may correspond to a respective dimension of the data. Each level may be connected to a higher level as well as to a lower level, if such a lower level exists within the hierarchical tree data structure. Each level may have a number of nodes corresponding to the respective dimension. A measure for a given dimension of the data may be evaluated based on the nodes corresponding to the level that corresponds to the given dimension and all preceding connected nodes. A result of the measure may be stored in the nodes corresponding to the level that corresponds to the given dimension.

The computing device may receive a hypercube data structure having a number of dimensions and corresponding values for each of the dimensions. The hypercube data structure may contain a number of results of measures that were evaluated on one or more of the dimensions. A root node for a hierarchical tree data structure may be determined by the computing device. The hierarchical tree data structure may have a number of levels, one of which may be connected to the root node. Each level of the hierarchical tree data structure may correspond to a respective dimension of the hypercube data structure. Each level may be connected to at least one other level, and each level may have a number of nodes corresponding to the respective dimension. The computing device may store the plurality of results in the nodes corresponding to the level that corresponds to the respective dimension.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a set of tables (Tables 6-7) showing a final data structure, e.g. a multidimensional cube, created by evaluating mathematical functions and an example database table (Table 8);

FIG. 6A-C are a set of tables (Tables 9-11) illustrating operations on the tables;

FIG. 11A is an example visual representation;

FIG. 11B is an example tree data structure supporting the visual representation of FIG. 11A;

DETAILED DESCRIPTION

Figure 1:
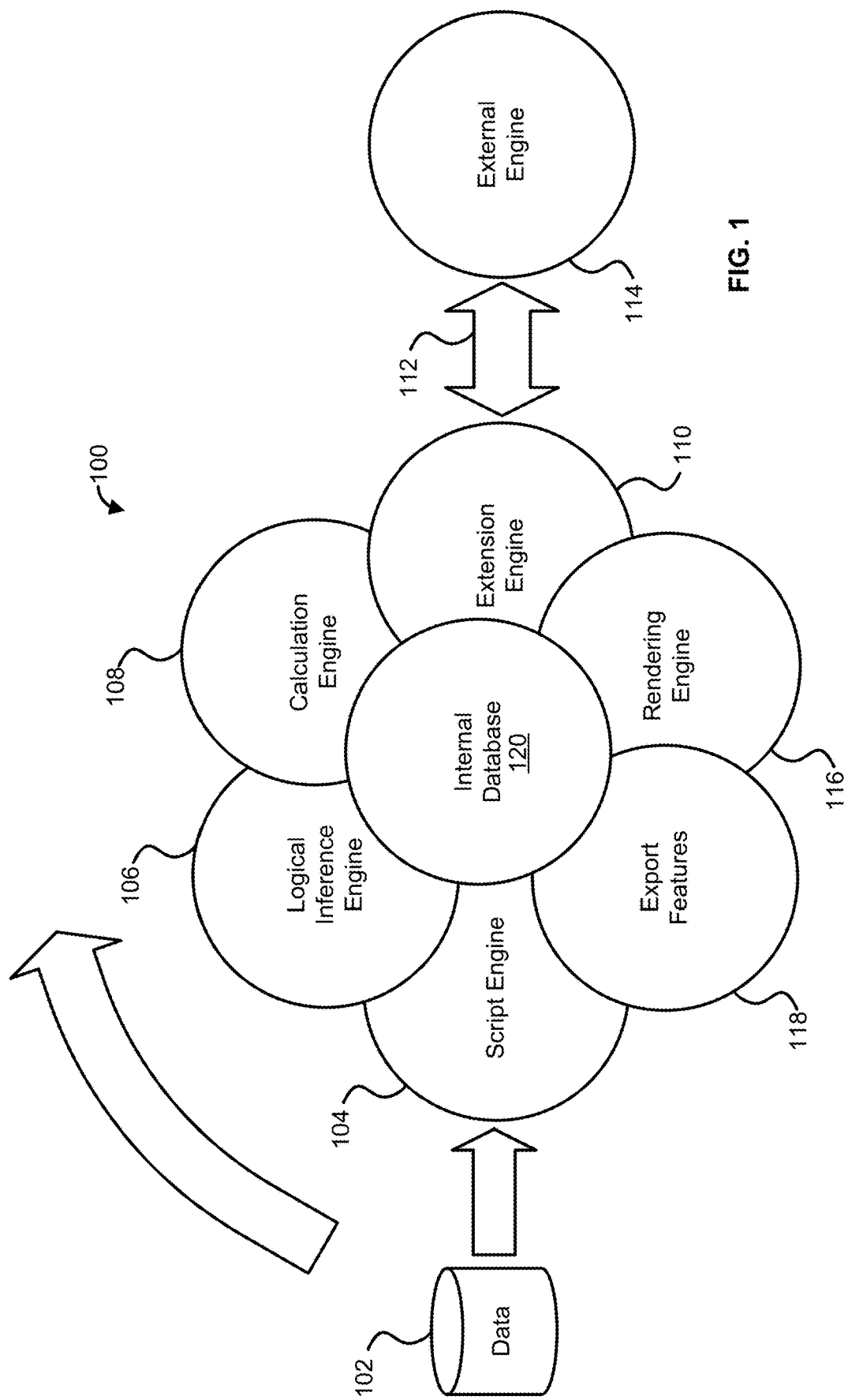
FIG. 1 is a schematic diagram showing an embodiment of a system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates an associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database, such as relational databases, post-relational databases, object-oriented databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

Figure 2:
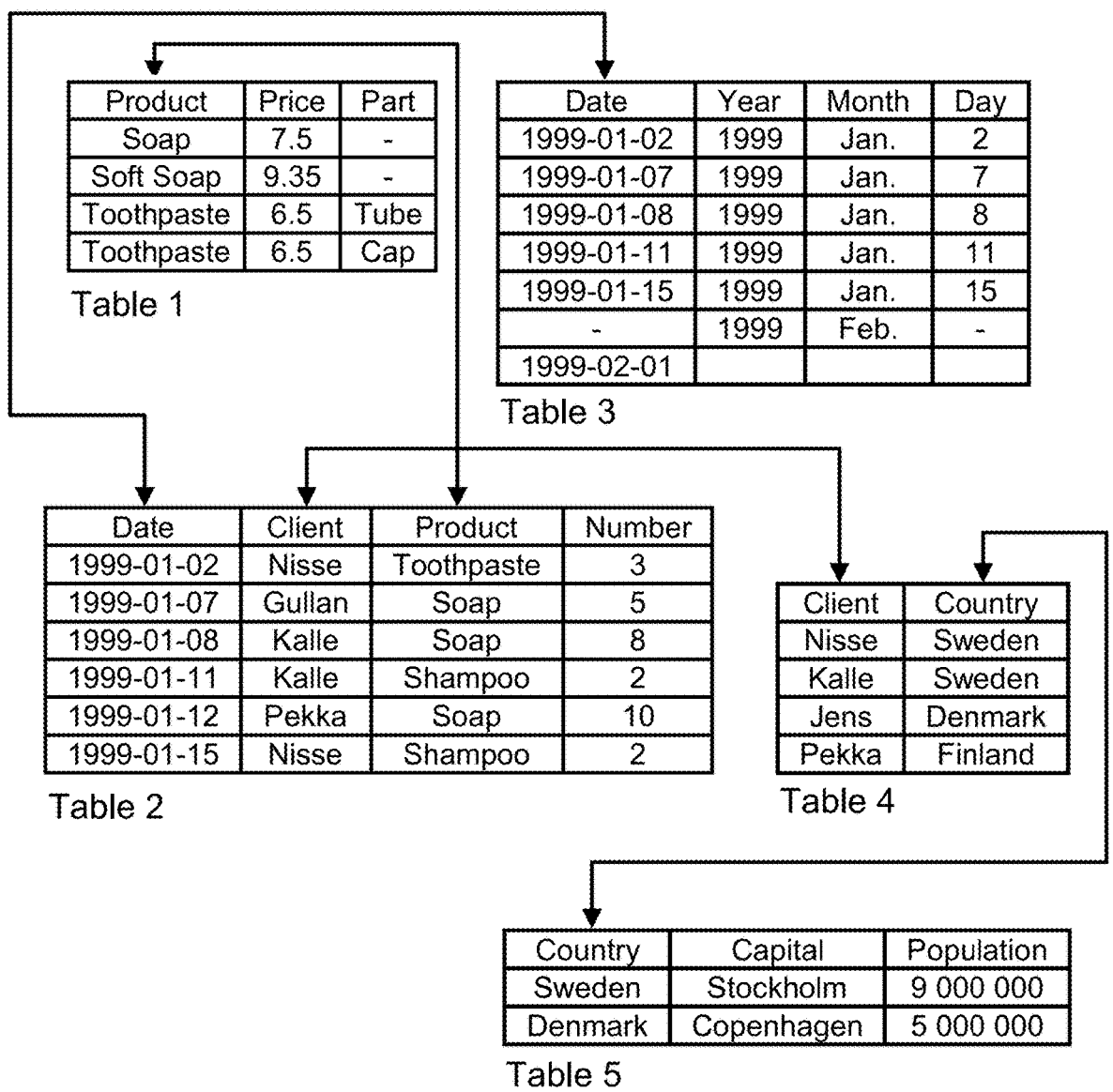
FIG. 2 is a set of tables (Tables 1-5) of a database and associations between variables in the tables.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

Returning to FIG. 1, in an aspect, the extraction of the data can comprise extracting an initial data set (or scope) from the data source 102, e.g. by reading the initial data set into the primary memory (e.g. RAM) of the computer. The initial data set can comprise the entire contents of the data source 102, or a subset thereof. The internal database 120 can comprise the extracted data and/or symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a data set.

In an aspect, the extracted data can be stored in a hierarchical tree data structure. As used herein, a tree is a collection of entities referred to as nodes. Nodes are connected by edges. Each node contains a value or data, and it may or may not have a child node. The first node of the tree is called the root. If this root node is connected by another node, the root is then a parent node and the connected node is a child. All tree nodes are connected by links called edges. The edges manage the relationship between nodes. Leaves are the last nodes on a tree and do not have child nodes. The height of a tree is the length of the longest path to a leaf. The depth of a node is the length of the path to its root.

Various hierarchical tree data structures can be used such as a binary tree or a non-binary tree. Data can be stored in a hierarchical tree data structure, for example, by using an adjacency list model or a nested set model. In the adjacency list model, each record in the database includes a "parent id," and a recursive query through the records build the children, siblings, and levels of the tree. Adding a new record to the system only requires the ID of the parent, with no other indexing. The advantages of this method are the simplicity, and low-cost of entering new records. In the nested set model, an index can be generated for each record using nested sets. In a nested set, each record contains two indices, a "left" and "right" index number. The indexes are created by starting at the root of the tree, and working from left to right through each node of the tree. Each node, in essence, is a container holding the indexes of each of the child nodes below.

Figure 5A:
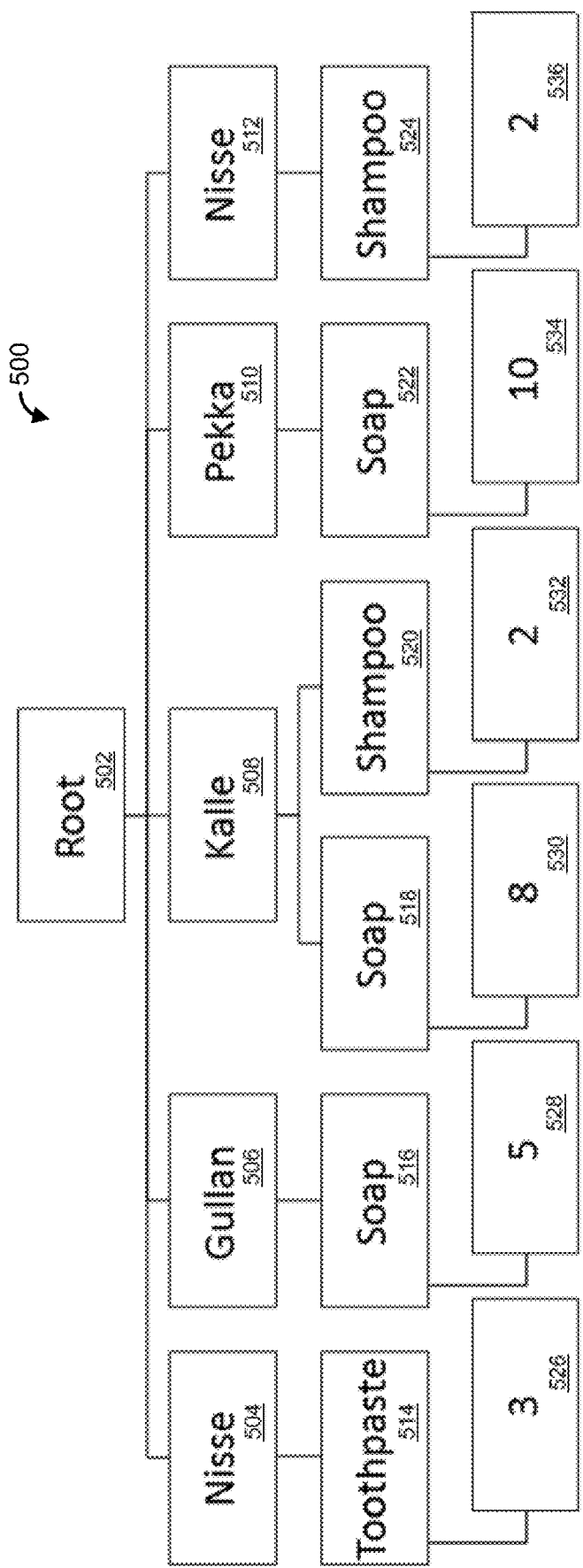
FIG. 5A-G are example representations of tree data structures.

FIG. 5A illustrates an example hierarchical tree data structure 500 (non-binary) based on the Table 2 from FIG. 2. A root node 502 is connected to a node Nisse 504, a node Gullan 506, a node Kalle 508, a node Pekka 510, and a node Nisse 512. Each node 504-512 represents a client from the client column of Table 2 of FIG. 2 and represents a child node of the root node 502. The node Nisse 504 is connected to a node Toothpaste 514. The node Toothpaste 514 represents a product from the product column of Table 2 of FIG. 2 and represents a child node of the node Nisse 504. Similar to the node Nisse 504, each node 506-512 is connected to one or more child nodes, representing toothpaste, soap, and shampoo (nodes 514-524). The node Toothpaste 514 is connected to a node "3" 526. The node "3" 526 represents a number of sales from the number column of Table 2 of FIG. 2 and represents a child node of the node Toothpaste 514. Similar to the node Toothpaste 514, each node 516-524 is connected to a child node, representing a number of sales (nodes 528-536).

Figure 5B:
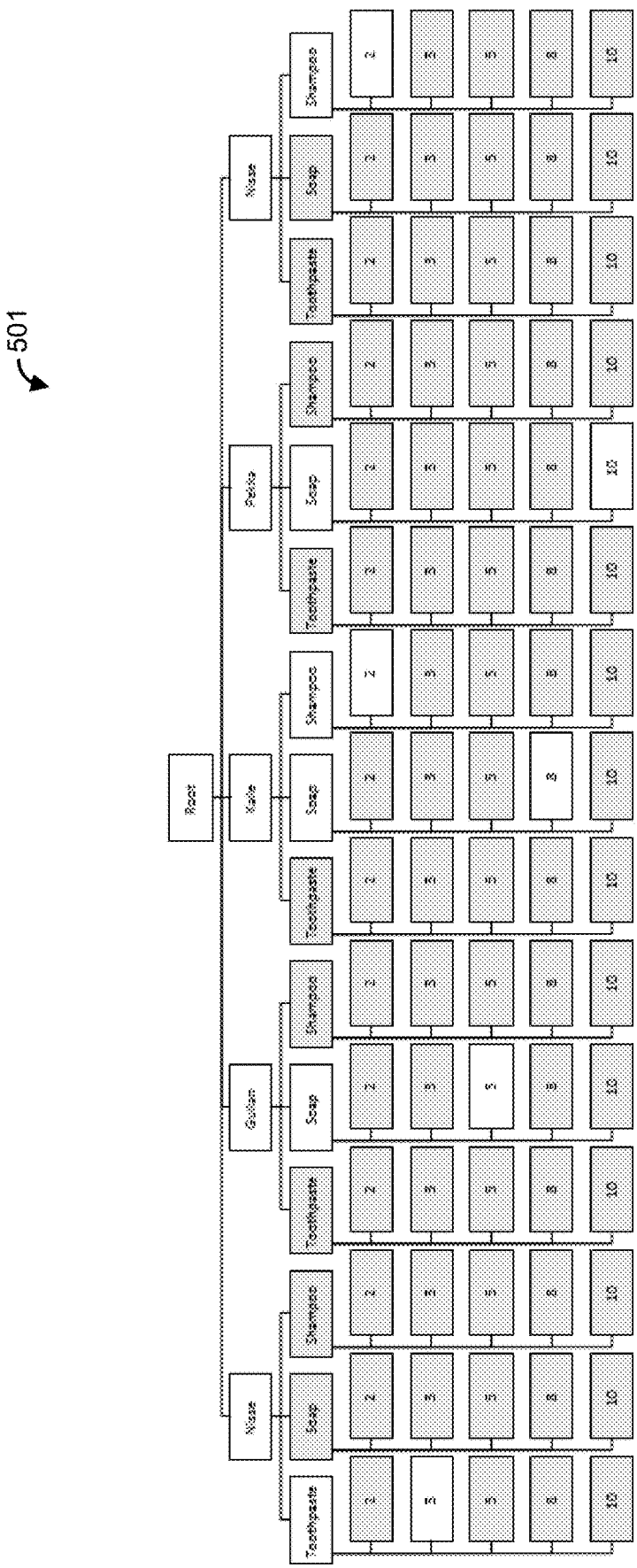

FIG. 5B illustrates an alternative tree 501. Tree 501 contains all possible combinations of all possible values in all dimensions. The result is a sparse tree with combinations that do not exist in the original table. Tree 501 is a help-structure for building charts that use multi-level paging and enables paging the levels separately, for example, by having three separate scroll bars.

Once the data has been extracted, a user interface can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the data set, causing a logical inference engine 106 to evaluate a number of filters on the data set. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g., indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. Depending on the amount of data, the data model can be too large to be loaded into memory. To address this issue, the logical inference engine 106 can generate one or more indexes for the data model. The one or more indexes can be loaded into memory in lieu of the data model. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

Based on current selections and possible rows in data tables a calculation/chart engine 108 can calculate aggregations in objects forming transient hypercubes in an application. The calculation/chart engine 108 can further build a virtual temporary table from which aggregations can be made. The calculation/chart engine 108 can perform a calculation/evaluation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object.

Figure 5C:
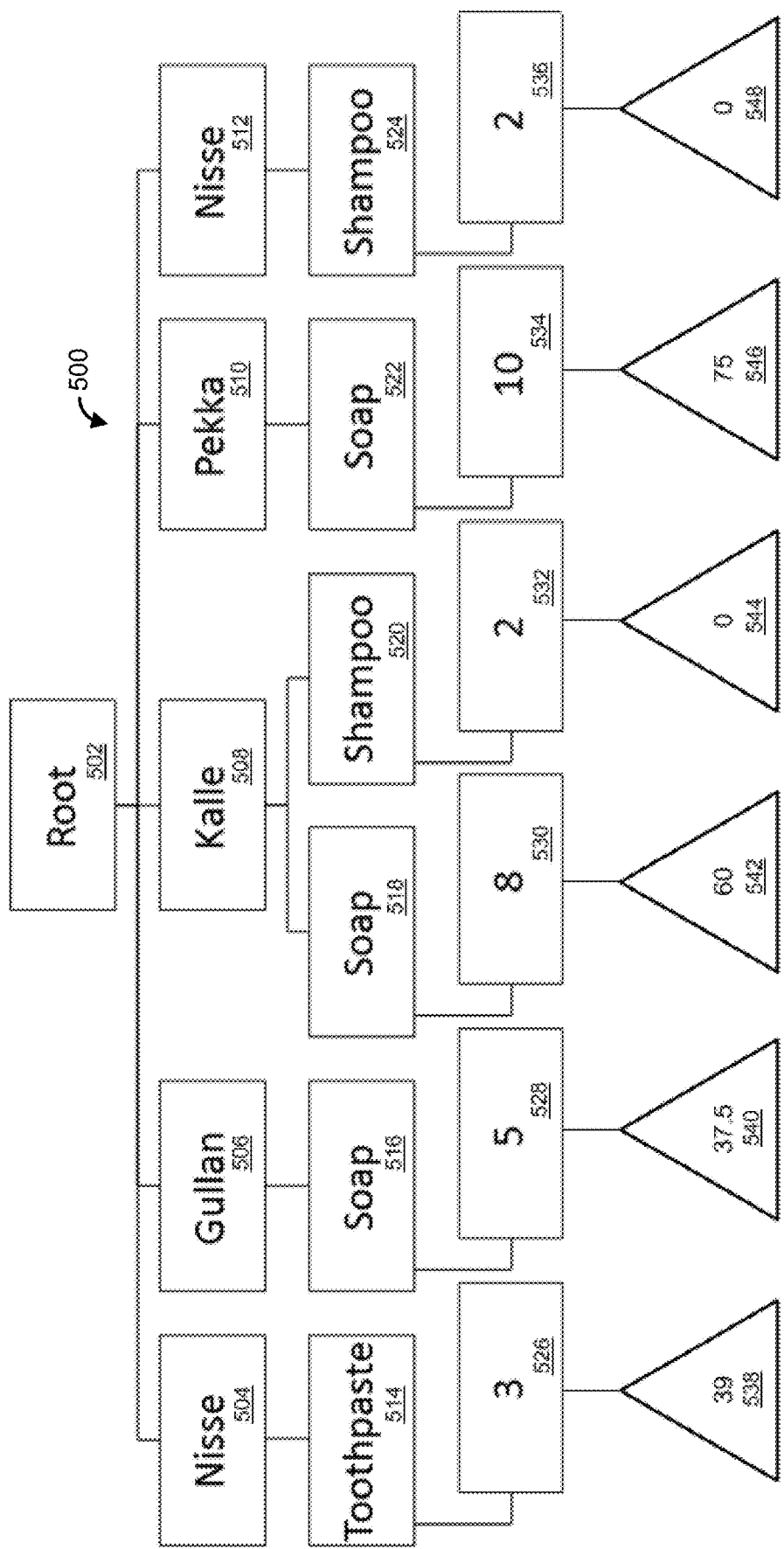

FIG. 5C illustrates the example hierarchical tree data structure 500 (non-binary) based on Table 8 from FIG. 4. Table 8 from FIG. 4 represents the results from the calculation/chart engine 108 evaluating a measure Sum(Quantity)*Sum(Price) on Table 1 and Table 2 from FIG. 2. The results of the measure are reflected in the column Additional nodes 538-548 containing the results of the evaluated measure are added to the tree and connected to respective number nodes 526-536. The tree 500 represents direct translations from a table to a tree structure. Such tree structures represent poorly mapped concepts with multiple limitations and restrictions such as what data to fetch (paging), sorting, and new features like trellis, aggregate/disaggregate, multiple dimensions and measures in charts, charts in charts etc . . . . For Trellis for example, all three blocks are important because we need to control exactly which data to display based on multiple separate scroll bars (multi level paging), we also need to control the sorting on a per-level basis and not allow breaking the parent-child groupings in order to allow sorting each direction separately from the others while not allowing nonsensical sorting operations like "Sort the entire tree/chart alphabetically". It is nonsensical because the levels are sorted separately from each other and a node in a lower level can never be sorted in the same list as the nodes in another level. Lastly we will need to fill in missing combinations in order to allow the multi-level-scrolling to know all possible combinations no matter where in the data set we page out a piece of it.

Figure 5D:
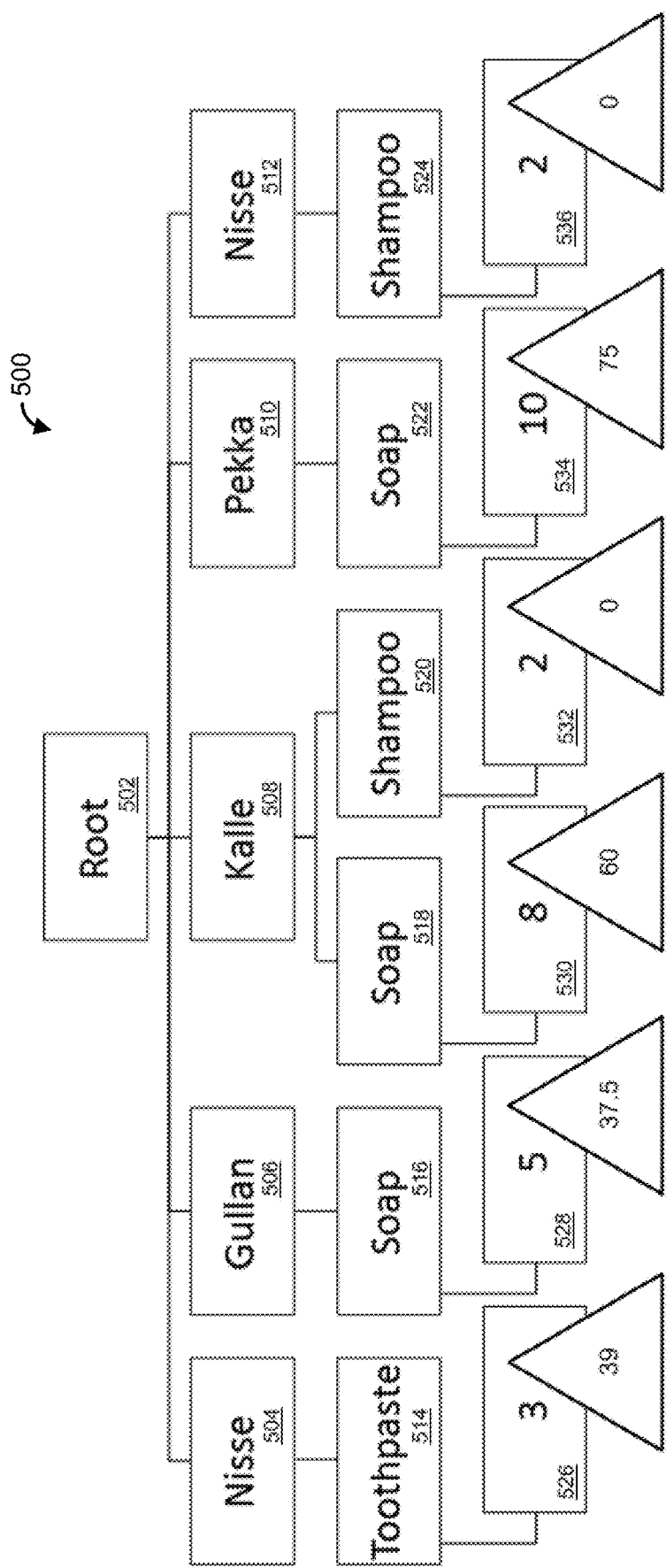
Figure 5E:
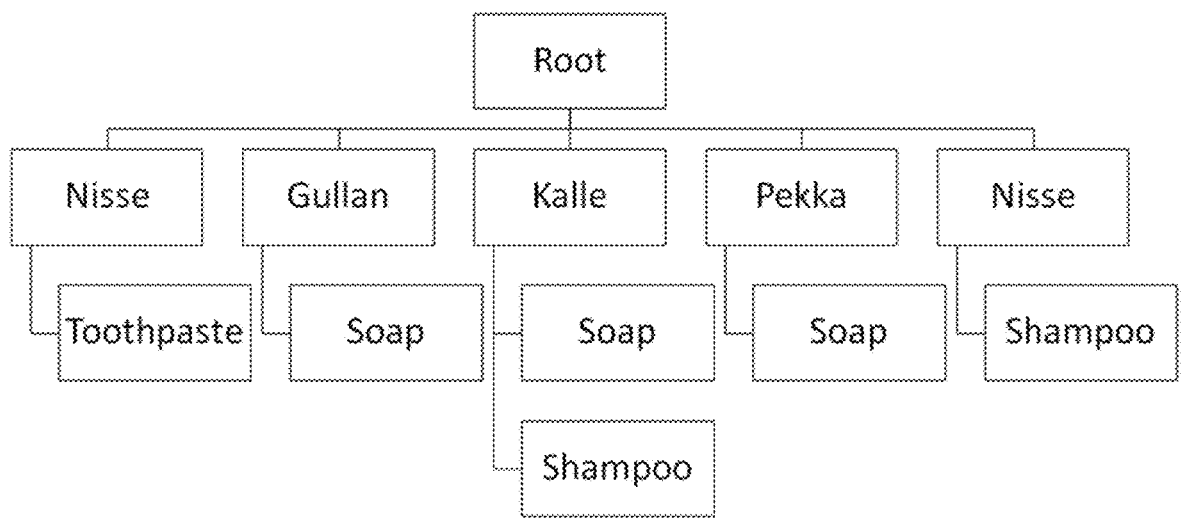
Figure 5F:
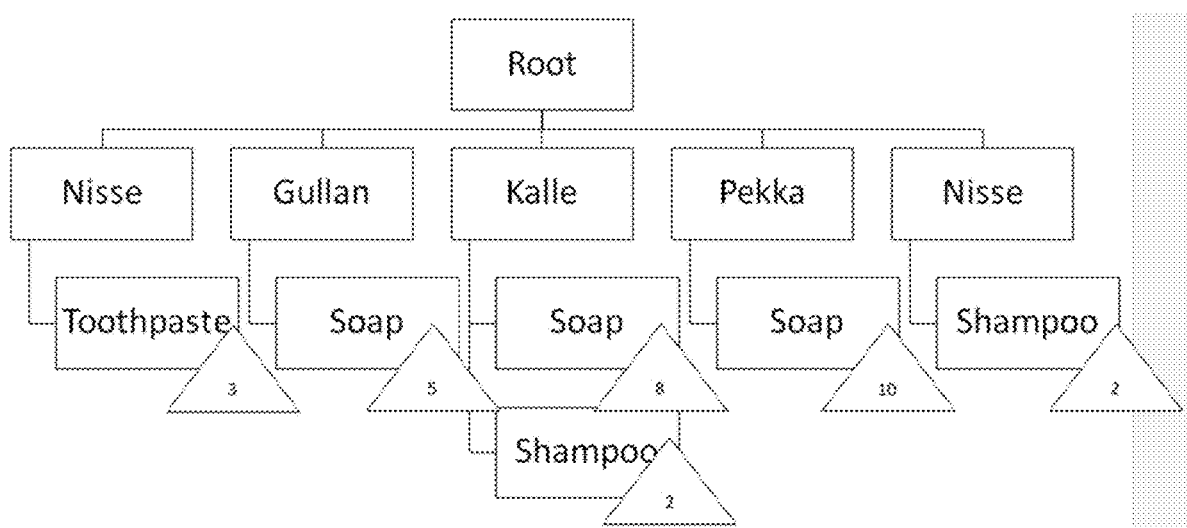

In an aspect, the present methods and systems provide for storage of measures not as nodes, but rather as values within nodes. As shown in FIG. 5D, the nodes 538-548 do not exist, but rather the results of evaluating the measure (Sum(Quantity)*Sum(Price)) are stored in the respective number nodes. This improvement in hierarchical tree data structure merges the bottom level into an appropriate dimension level which, in this example, when translating a table into a tree would be the lowest level. The resulting hierarchical tree data structure is leaner. FIG. 5E illustrates another tree representation of the data from FIG. 2. FIG. 5F illustrates the results of evaluating a measure Sum(Quantity) on the second level. The results of the measure are stored in the nodes of the second level, rather than appended to the tree as results nodes.

Figure 5G:
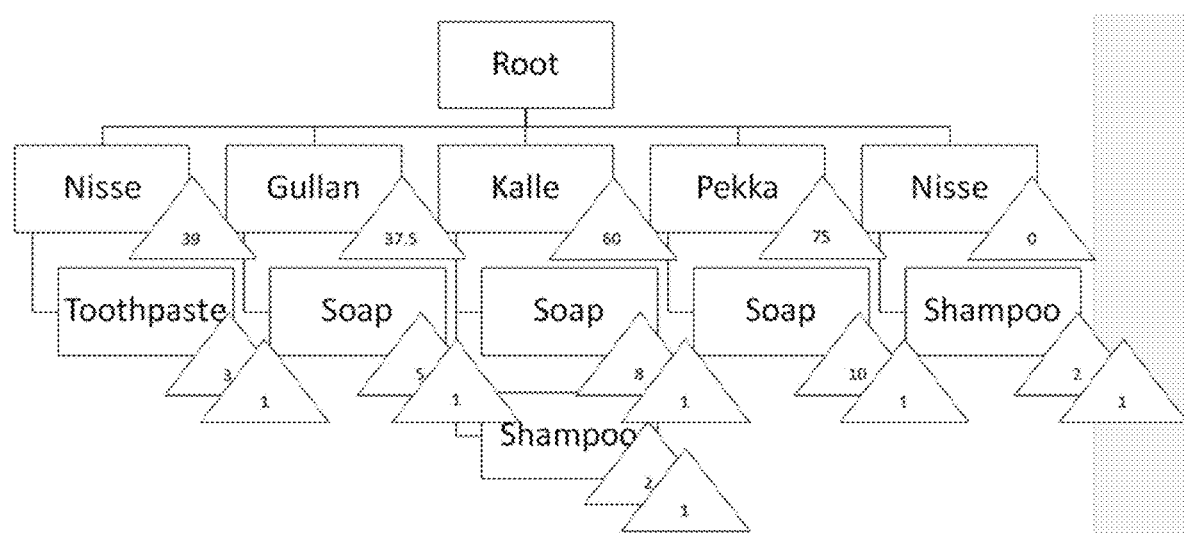

In an aspect, multiple measures can be evaluated and can be stored in the node associated with the multiple measures. Since the disclosed hierarchical tree data structures have effectively removed the notion of different types of levels by removing the value-level, it can be assumed that all levels are equals. Accordingly, data can be added to any level, not just the lowest level. Data on any level is expected to be calculated based on the current level and all parent levels. This means it is expected to ignore the child-levels and make data on an intermediate level a possible vessel for metadata of its children. The number of children cannot be counted, totals obtained, or get any kind of data calculated on the correct level and without duplicates. Storing multiple measures in the same node is useful when the multiple measures are used in the same visual representation (e.g., in a scatter plot x- and y-values are required and potentially a size-value). For example, in FIG. 5G, a measure (Sum(Quantity)*Sum(Price)) can be evaluated on the first level (client level). A measure (Sum(Quantity) and a measure (Count(Date)) can be evaluated on the second level (product level). The results of evaluating the measures can be stored in the respective nodes. Any number of measures can be evaluated and stored in respective dimension nodes.

Storing multiple measures in a node can rely on a naming convention to identify what measure was evaluated. A benefit from identifying measures by a stable name (instead of the index) is that it simplifies moving and removing measures. For example, if there are two measures on the second level, and a user decides to move the first measure to the top level, now the second measure in the second level is the first measure. The result is that the system has to update all references to the index for this measure as well as the one moved.

In the disclosed hierarchical tree data structure, adding multiple measures does not increase the number of levels or even the number of nodes. The disclosed hierarchical tree data structure fills up the already existing nodes with more data. The resulting improvement defies how dimensions and measures are ordinarily treated and puts dimensions in a much more senior position to measures. This explains why in a table structure the entire table can be sorted by a measure—but in a chart a dimension can only be sorted by a measure—not the entire chart.

FIG. 6A illustrates an example data table (Table 9). Table 9 can contain raw data values of a number of data variables (dimensions). In Table 9 each data record contains data values of the dimensions: "City," "Company," "Year," and "Sales." Typically, the data values are stored in the form of ASCII-coded strings, but can be stored in any form. The dimensions are interchangeable and do not require a certain order to not confuse the hierarchical tree data structure with inherently hierarchical dimensions such as Continent, Country, and City.

In Table 9, a dimension builds up the rows. Adding a new dimension will multiply the number of rows with the number of items in the dimension while also adding one more column. Adding a measure only adds a new column. For example, as shown in FIG. 6B, adding two dimensions "City" and "Company" with two values each will result in a table (Table 10) with four rows and two columns. Adding a measure to this data set will only add a column, still ending up with four rows, but with three columns. For example, as shown in FIG. 6C, a measure Sum(Sales) adds a column to Table 10, resulting in Table 11.

Charts works differently when it comes to adding new dimensions and measures. Adding a second dimension in a bar chart can group or stack the bars and adding a third measure in a scatter plot can be used for sizing the bubbles. Usually a chart has visual representations for the innermost dimension, and use the measures to size, shape, color or position the visual representation. A chart with multiple dimensions is often built as a hierarchy and therefore the hierarchical tree data structure disclosed reflects this.

Figure 6D:
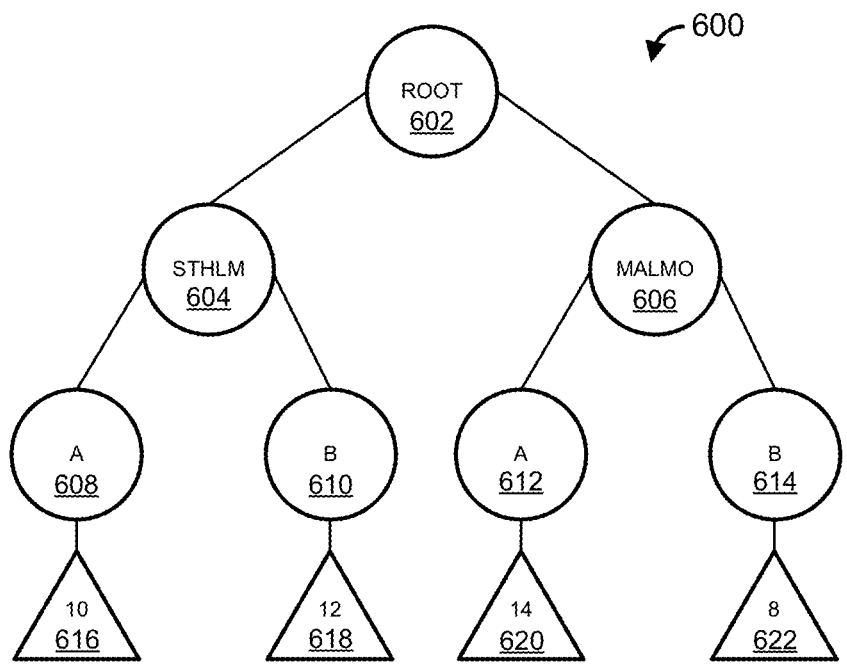
FIG. 6D-E are tree data structures derived from Tables 9-11.

As described previously, a tree contains levels and nodes instead of rows and columns. Adding a new dimension will add a new level and each node is a dimensional value. In a direct translation of a table to a dimension the measure(s) can be added on the bottom as a level as shown in FIG. 6D. FIG. 6D illustrates a tree 600 (binary) having a root node 602 connected to a node Sthlm 604 and a node Malmo 606, creating a City level. Each node 604-606 represents a city from the city dimension of Table 9 of FIG. 6A and represents a child node of the root node 602. The node Sthlm 604 is connected to a node A 608 and a node B 610. Each node 608-610 represents a company from the company dimension of Table 9 of FIG. 6A and represents a child node of the node Sthlm 604. The node Malmo 606 is connected to a node A 612 and a node B 614. Each node 612-614 represents a company from the company dimension of Table 9 of FIG. 6A and represents a child node of the node Malmo 606. The nodes 608-614 create a Company level.

The node A 608 is connected to a node "10" 616. The node "10" 616 represents a result of the measure Sum(Sales) from the Sum(Sales) dimension of Table 11 of FIG. 6A and represents a child node of the node A 608. The node B 610 is connected to a node "12" 618. The node "12" 618 represents a result of the measure Sum(Sales) from the Sum(Sales) dimension of Table 11 of FIG. 6A and represents a child node of the node B 610.

The node A 612 is connected to a node "14" 620. The node "14" 620 represents a result of the measure Sum(Sales) from the Sum(Sales) dimension of Table 11 of FIG. 6A and represents a child node of the node A 612. The node B 614 is connected to a node "8" 622. The node "8" 622 represents a result of the measure Sum(Sales) from the Sum(Sales) dimension of Table 11 of FIG. 6A and represents a child node of the node B 614. The nodes 616-622 create a Sum(Sales) level.

The root node 602 corresponds to a global level and the tree 600 does not repeat a value from the city dimension as in Table 11, so the tree 600 contains 11 nodes instead of 12 cells as in Table 11. Each level of the tree corresponds to a column (dimension) in the table. As in the example non-binary tree 500, tree structures such as the binary tree 600 represent poorly mapped concepts with multiple limitations and restrictions such as what data to fetch (paging), sorting, and new features like trellis, aggregate/disaggregate, multiple dimensions and measures in charts, charts in charts etc . . . .

Figure 6E:
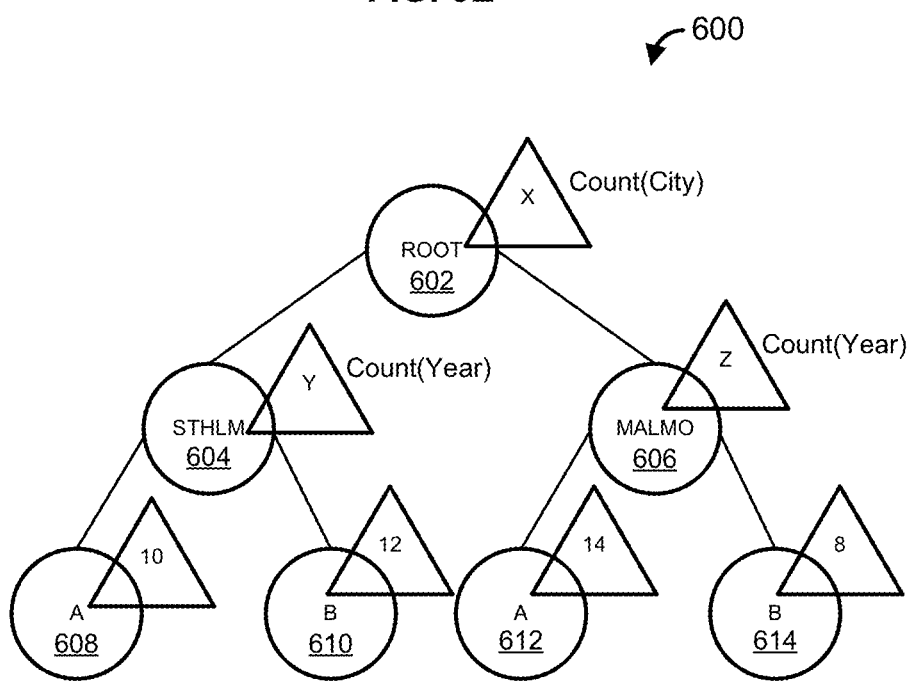

In an aspect, the present methods and systems provide for storage of measures not as nodes, but rather as values within nodes. As shown in FIG. 6E, the nodes 616-618 do not exist, but rather the results of the measure Sum(Sales) from the Sum(Sales) dimension of Table 11 of FIG. 6A are stored in the respective company nodes 608-614. This improvement in hierarchical tree data structure merges the bottom level into an appropriate dimension level which, in this example, when translating a table into a tree would be the lowest level. The resulting hierarchical tree data structure is leaner.

In an aspect, multiple measures can be evaluated and can be stored in the node associated with the multiple measures. Since the disclosed hierarchical tree data structures have effectively removed the notion of different types of levels by removing the value-level, it can be assumed that all levels are equals. Accordingly, data can be added to any level, not just the lowest level. Data on any level is expected to be calculated based on the current level and all parent levels. This means it is expected to ignore the child-levels and make data on an intermediate level a possible vessel for metadata of its children. The number of children can be counted, totals obtained, or any kind of data calculated on the correct level and without duplicates. Storing multiple measures in the same node is useful when the multiple measures are used in the same visual representation (e.g., in a scatter plot x- and y-values are required and potentially a size-value). Storing multiple measures in a node can rely on a naming convention to identify what measure was evaluated. For example, in FIG. 6E, a measure Count(City) can be evaluated for the dimension City. The results of evaluating the measure Count (City) can be stored in the root node 602. A measure Count(Year) can be evaluated for the dimension Year. The results of evaluating the measure Count(Year) can be stored in the node Malmo 606 and the node Sthlm 604, respectively. The tree 600 enables counting of the number of cities on the root level—meaning this value only exists once in the data set. The number of years for Sthlm and for Malmo can be calculated separately and the Sum(Sales) for each Company in each City can be calculated. Any number of measures can be evaluated and stored in respective dimension nodes.

Figure 7:
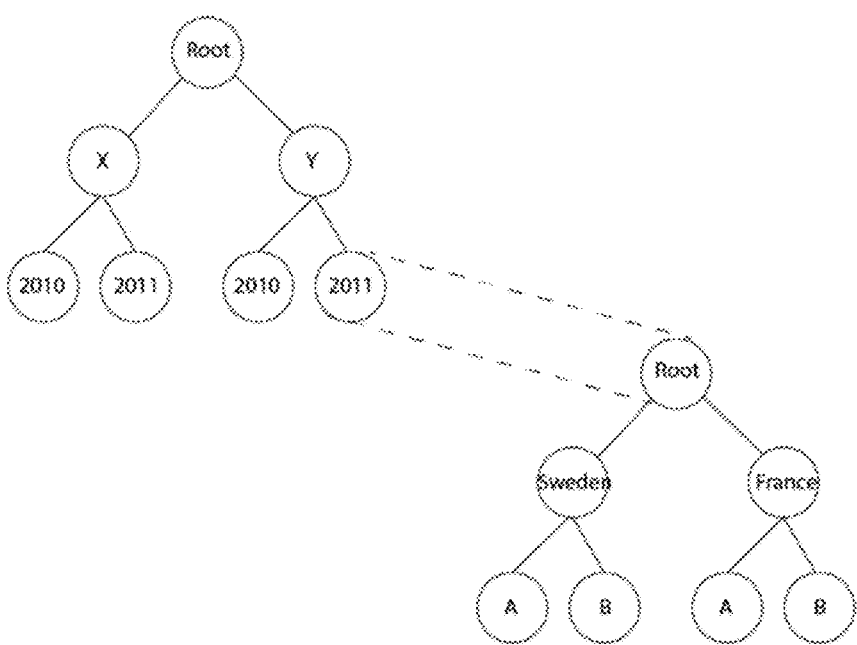
FIG. 7 illustrates an example operation performed on a tree data structure.

As the disclosed hierarchical tree data structures do not differ between levels, the trees can be viewed as a "plug-and-play" data structure. As shown in FIG. 7, adding a new level to an existing tree will generate a bigger tree, cut off a tree and two independent, fully self-contained data structures are created.

Results of the calculation can be passed to a rendering engine 116 and/or optionally to an extension engine 110. Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 114 can comprise, for example, an Application Programming Interface (API). The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprise births there can be timestamps of the births and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc.) based on selections/calculations. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Figure 8A:
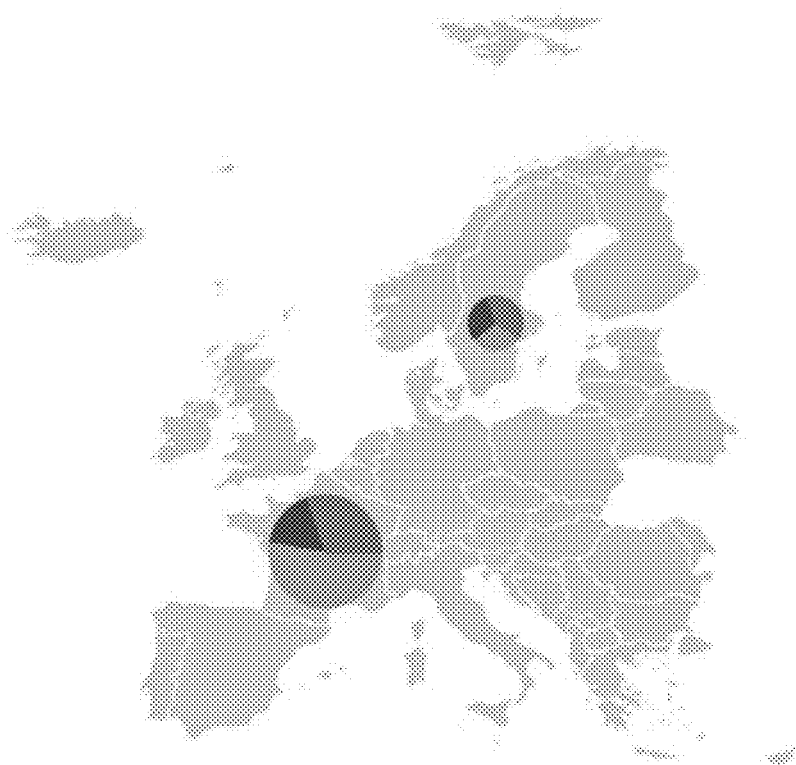
FIG. 8A is an example visual representation.
Figure 8B:
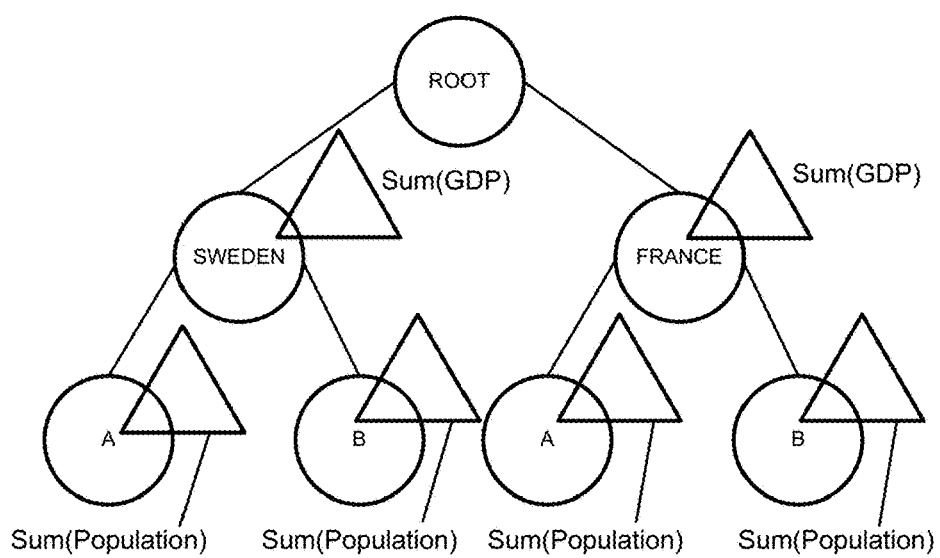
FIG. 8B is an example tree data structure supporting the visual representation of FIG. 8A.

The disclosed hierarchical tree data structures enable many visual representations (e.g., visualizations). For example, the rendering engine 116 can generate, based on a tree, a pie chart visualizing age distribution can be drawn on top of a map, and the GDP value of the country can be visualized with the size of the chart it as shown in FIG. 8A. FIG. 8B illustrates a tree 800 that supports the visualization in FIG. 8A. The tree 800 contains results of a measure Sum(GDP) stored on a level containing country nodes Sweden and France. The tree 800 also contains the results of a measure Sum(Population) stored on a level containing population group nodes A and B. In this example, data is stored on two levels, on country level for the population—and on age group level for the pie slices. This is one of many examples of visualizing data on multiple levels in the same chart and in the same layer. Any chart that has a visual representation for multiple levels can be generated using the disclosed hierarchical tree data structures. For example, Sankey diagrams and box plots.

Figure 8C:
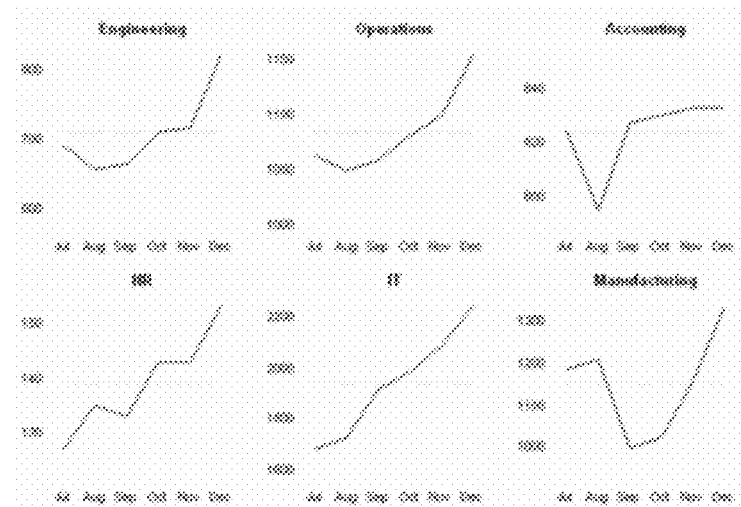
FIG. 8C-F are example visual representations.
Figure 8D:
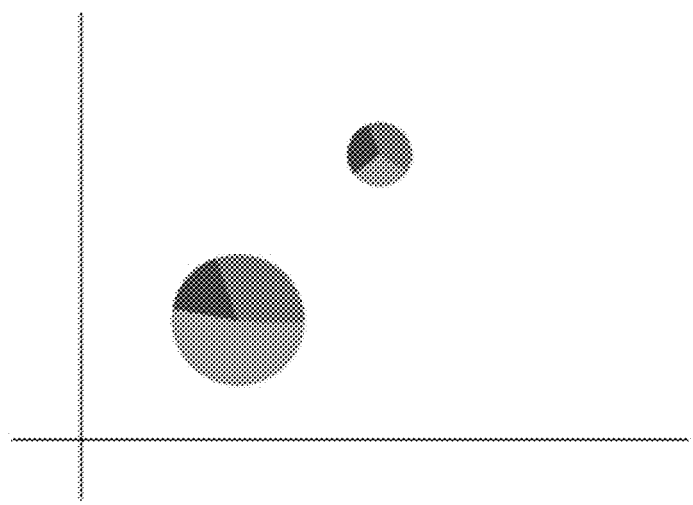

FIG. 8C illustrates a trellis, or a chart matrix, which is made up of multiple charts set up in an array in order to compare them. For trellised charts it is important that they show the same data at all times and that the scale is shared between them. All necessary info can be obtained using the disclosed hierarchical tree data structures by adding the appropriate data on the correct level of a common data tree. Having all trellised charts in the same tree also guarantees that the same data is shown in all charts and that scrolling in one chart will link to the others. As shown in FIG. 8D, for charts in charts, cutting a tree into smaller self-contained trees can be utilized to support such a visualization. Examples include, small bar charts in a map, pie charts in a scatter plot, line charts in tooltips, and the like. All the information necessary for generating such complex visualizations can be obtained in one single tree and then distributed among the visual representations without every visualization needing to know anything outside their current context.

Figure 8E:
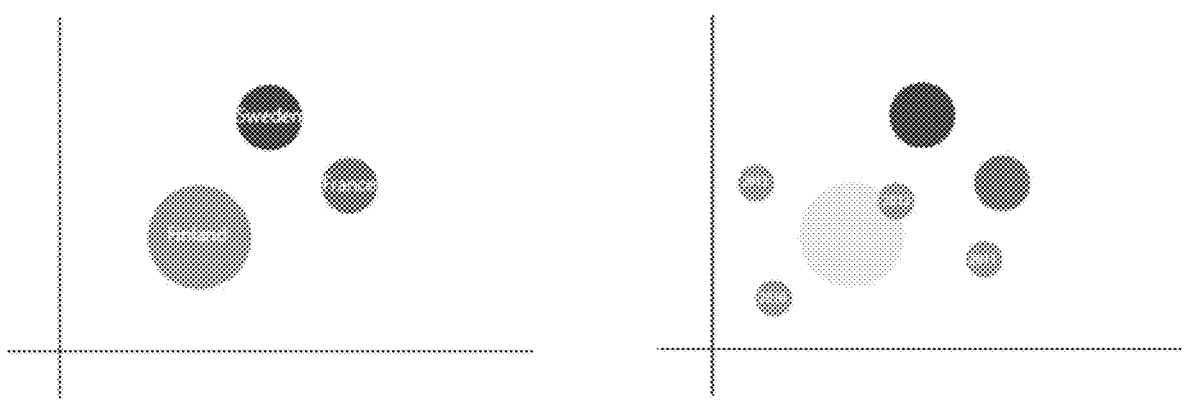
Figure 8F:
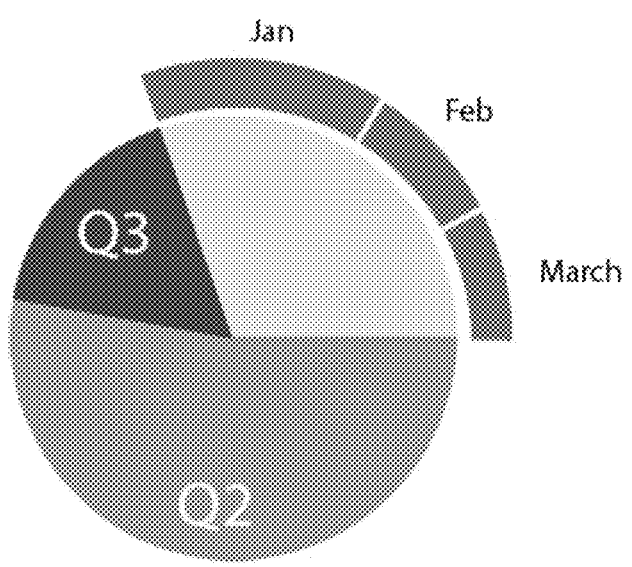

As shown in FIG. 8E and FIG. 8F, visualizations that can be generated that permit a Aggregate/Disaggregate behavior. The ability to view different levels of data at the same time can be added to any chart with the disclosed hierarchical tree data structures. As the disclosed trees do not require all data to reside only at the bottom of a tree, totals, sub-totals, and non-aggregated data can be visualized simultaneously.

Different export features or tools 118 can be used to publish, export or deploy any output of the associative data indexing engine 100. Such output can be any form of visual representation, including, but not limited to, textual, graphical, animation, audio, tactile, and the like.

The methods provided can be implemented by means of a computer program as illustrated in a flowchart of a method

Figure 3:
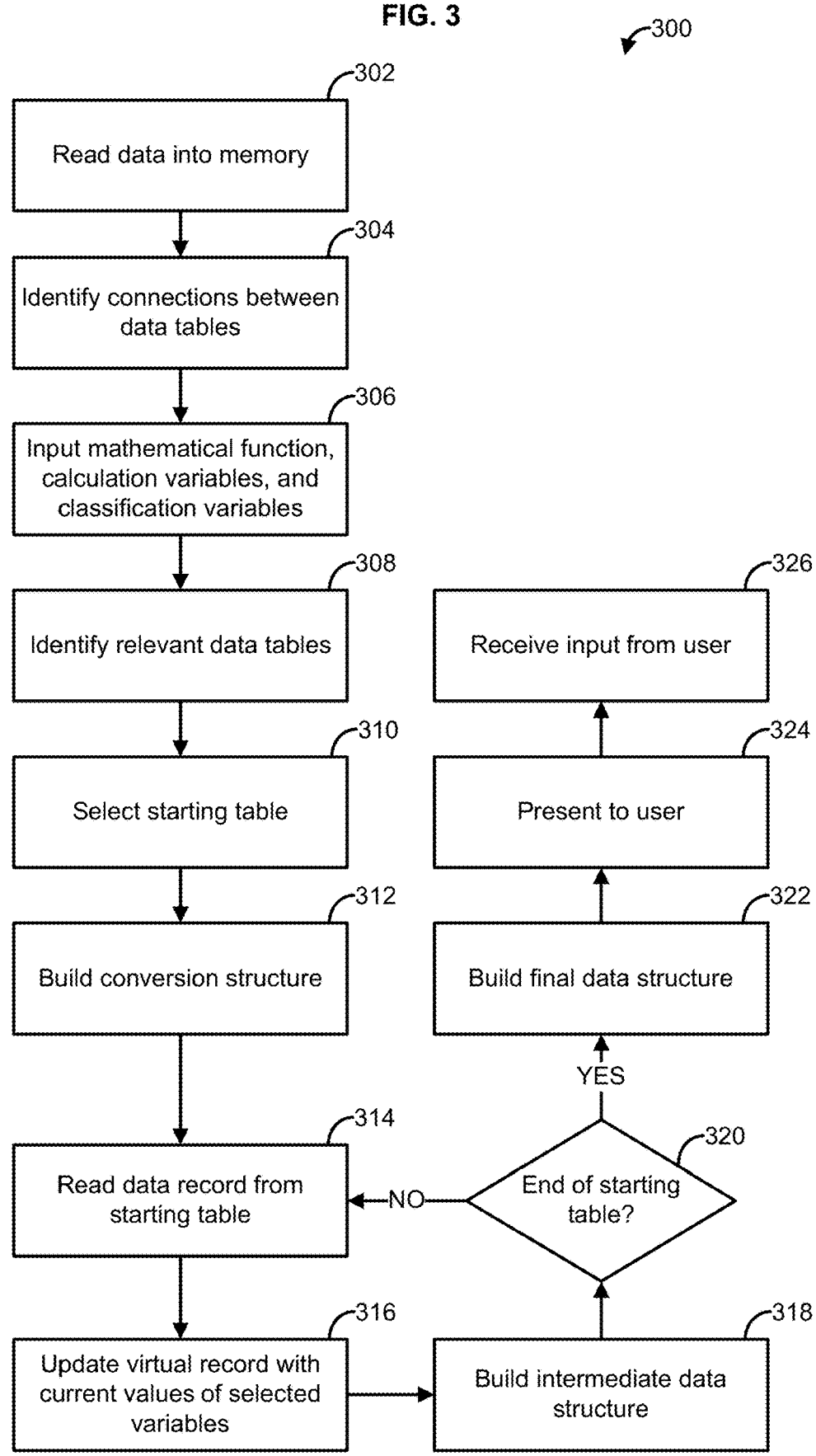
FIG. 3 is a schematic flowchart showing basic steps performed when extracting information from a database.

300 in FIG. 3. In a step 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g., the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the program can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g., if two tables have more than one variable in common, a snowflake structure can in some cases still be formed by means of special algorithms known in the art for resolving such loops.

In an aspect, at either step 302 or step 304 the read data can be assembled into one or more hierarchical tree data structures as disclosed herein.

After this initial analysis, the user can explore the database. In doing so, the user defines in a step 306 a mathematical function (e.g., a measure) to be evaluated/calculated/determined, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

The computer program then identifies in a step 308 all relevant data tables, e.g., all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g., frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in a step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in a step 312. This conversion structure can be used for translating each value of each connecting variable ("Date," "Product") in the starting table (Table 2) into a value of a corresponding selected variable ("Year," "Price") in the boundary tables (Table 3 and Table 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999 Jan. 12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in a step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In a step 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The virtual data record can also be used to provide results of the evaluated measure to a hierarchical tree data structure, the results being stored within nodes on a level corresponding to the evaluated measure.

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g., when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube (hypercube), as shown in non-binary notation in Table 6 of FIG. 4, can be created in a step 322 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in a step 324, as shown in Table 7 of FIG. 4. Alternatively, if the final data structure contains many dimensions, the data can be presented in a pivot table, in which the user can interactively move up and down in dimensions.

As disclosed above, the multidimensional cube is a calculation structure and there exists one multidimensional cube (with totals) per set of dimensions/measures. The disclosed hierarchical tree data structures are not competitors with the multidimensional cube, but are rather a transformation of the calculated results from one or multiple multidimensional cubes.

In some aspects, before data set from the multidimensional cube is presented in a visual representation (e.g., a chart), the data set can be transformed. Various transforms can be used, such as a straight table structure, a stacked structure, and a pivot structure. The stacked mode can comprise generating a tree structure mapped directly from the straight table mode and including metadata on each level of the tree, for example, the positive and negative sum of its children, which can be used for generating a stacked bar chart visualization. The pivot structure is a combination of two trees and a straight table, and can be used to generate a pivot table or a grid chart (e.g., trellis). An additional transform is disclosed herein. The hierarchical data tree structure disclosed is an additional transformation, with the unique capability to carry data from several multidimensional cubes. The tree allows fetching data in a flexible and controlled way, which can guarantee that all parent-nodes are visualizing the same child-nodes (or highlight that they are missing). The tree can also be useful for fetching one level of data at a time, enabling the rendering of a chart from a high level to a more granular level.

Figure 9A:
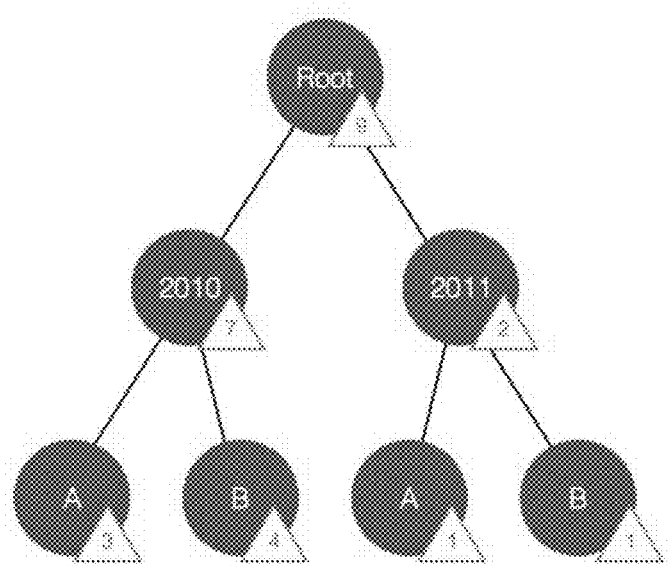
FIG. 9A illustrates an example tree data structure.
Figure 9B:
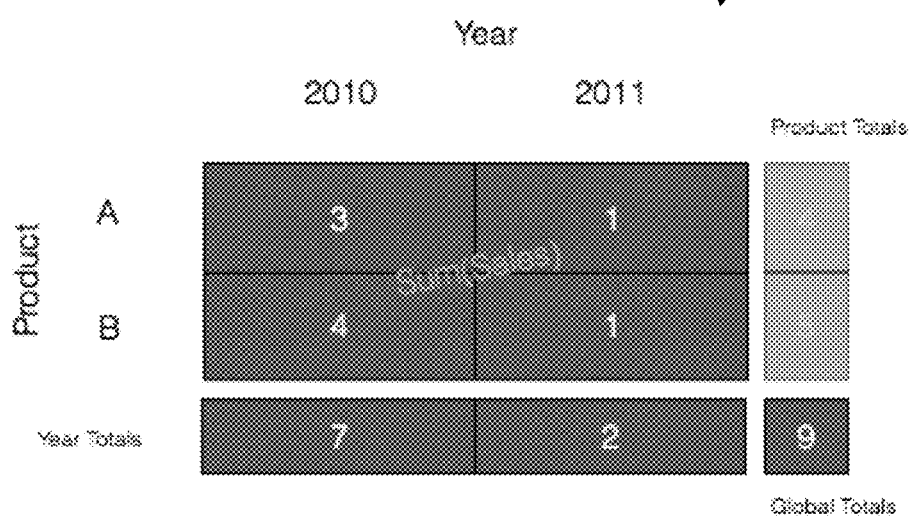
FIG. 9B illustrates a hypercube providing data for the example tree data structure of FIG. 9A.

FIG. 9A and FIG. 9B illustrates a tree 900 with the same data on all levels and correspondence to a multidimensional cube 901. The multidimensional cube 901 provides the results behind the tree 900. The tree 900 has the same expression (Sum(Sales)) on all three different levels. The multidimensional cube 901 includes a totals column that cannot be represented in the tree 900, "Product Totals (Sum(Total<Product> Sales))." This is because the tree 900 has ordered the dimensions in a hierarchy whereas the cube has no inherent order.

In a multidimensional cube, the dimensions can be combined freely, whereas in a tree a node always inherits from a parent. This is why the <Year> totals and the <Year, Product> totals can be obtained but not the <Product> totals in the tree paradigm. To get the <Product> totals a new tree can be built that has Product on the first level under the Global root node. If, a three-dimensional cube is generated instead of the two-dimensional cube 901, a tree could only reach three out of seven totals-combinations. As the number of dimensions grows even further the hierarchical tree data structure reaches a lower and lower percentage of the possible totals.

Figure 10:
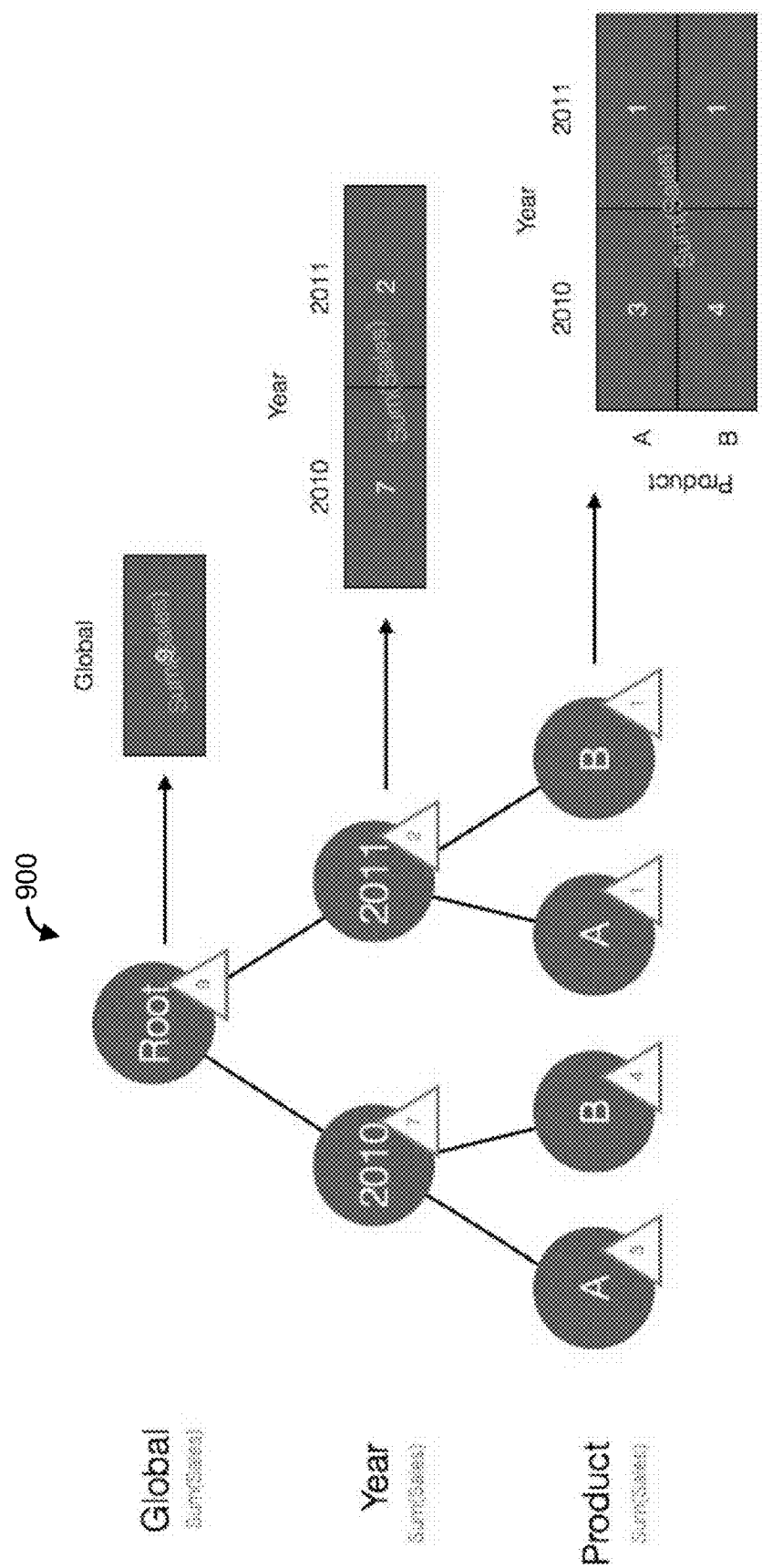
FIG. 10 is an example tree data structure relying on a hypercube to support each level of the tree.

To address this issue, a tree can be constructed such that each level has an associated multidimensional cube. Accordingly, as shown in FIG. 10, the tree 900 would correspond to three different multidimensional cubes, all with the same expression but with different dimensions. The resulting tree 900 disconnects each level from each other and different levels can have different data. For example, changing the expression on the Year level to Count(Product) then the Year level would correspond to the second level cube to have a different expression.

Thus, the final data structure, the multidimensional cube, can also be used to provide results of the evaluated measure to a hierarchical tree data structure, the results being stored within nodes on a level corresponding to the evaluated measure.

FIG. 11A illustrates an example a hierarchical chart 1100 that utilizes color, shape, size, and position to visualize data on three different levels at the same time. The example hierarchical chart 1100 illustrates the power of the disclosed tree structure. The charts generated by the disclosed hierarchical tree data structures are not merely stacked bar charts, treemaps, or pie charts on maps. The chart 1100 in FIG. 11A highlights the building blocks that makes a chart hierarchical. In the chart 1100 it can be observed that each value in the tree is both visualized by sizing each shape and in text. The second level is also colored by the Count(Day) value. Each shape is positioned based on its position in the tree. And the children can inherit values (color in this case) from its parent. FIG. 11B illustrates the underlying hierarchical tree data structure. If a one-to-one mapping between a cube and the data set was utilized then multiple data sets would have been required for the chart 1100. Thus, having a tree structure transformation with a many-to-one relationship to multidimensional cubes represents a technological improvement over the state of the art data structures. The creation and the rendering of hierarchical charts are simplified using the disclosed hierarchical tree data structures. Moreover, use of the disclosed hierarchical tree data structures reduces the data set size which decreases network traffic.

Returning to FIG. 3, at step 326, input from the user can be received. For example, input from the user can be a query in a form of a selection and/or de-selection of the presented results and/or visual representation (e.g., chart). For example, the database as referred to in any of FIG. 2, FIG. 4, and FIG. 6A-6C can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user according to the hierarchical tree data structure with various visualization techniques.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figure 12:
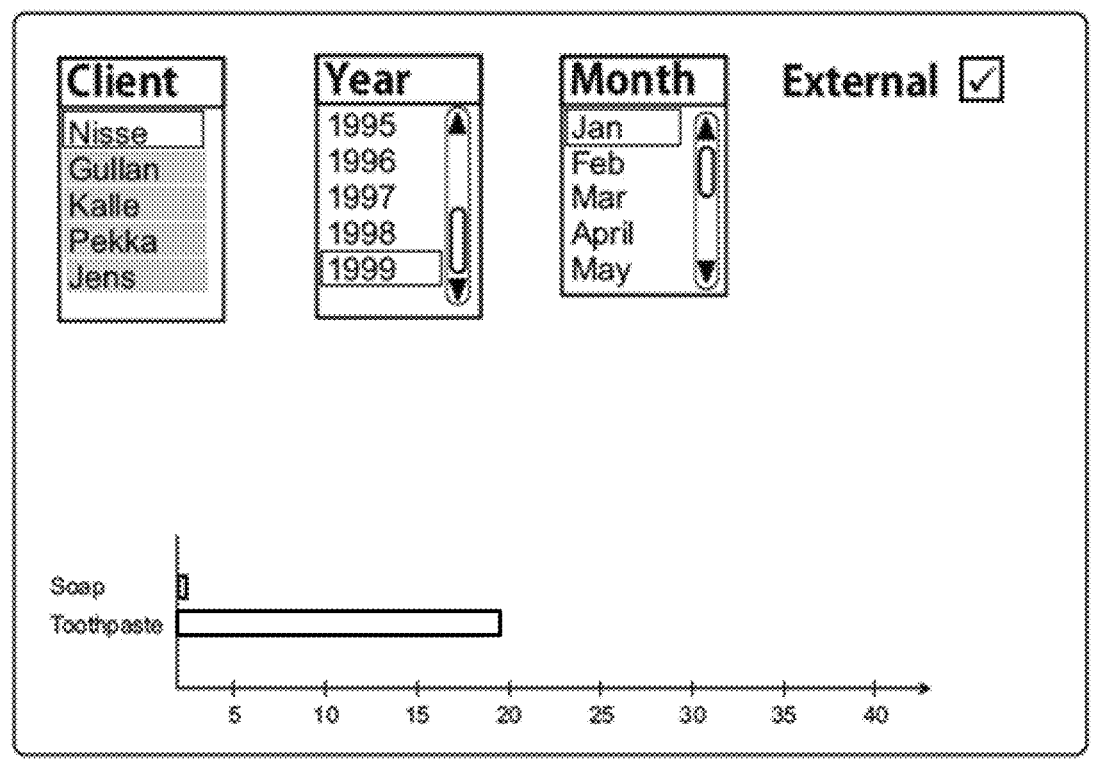
FIG. 12 is a an example user interface.

The result of a standard query can be a smaller subset of the data within the database, or a result set, which is comprised of the records, and more specifically, the data element types and data element values within those records, along with any calculated functions, that match the specified query. For example, as indicated in FIG. 12, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way.

Figure 13:
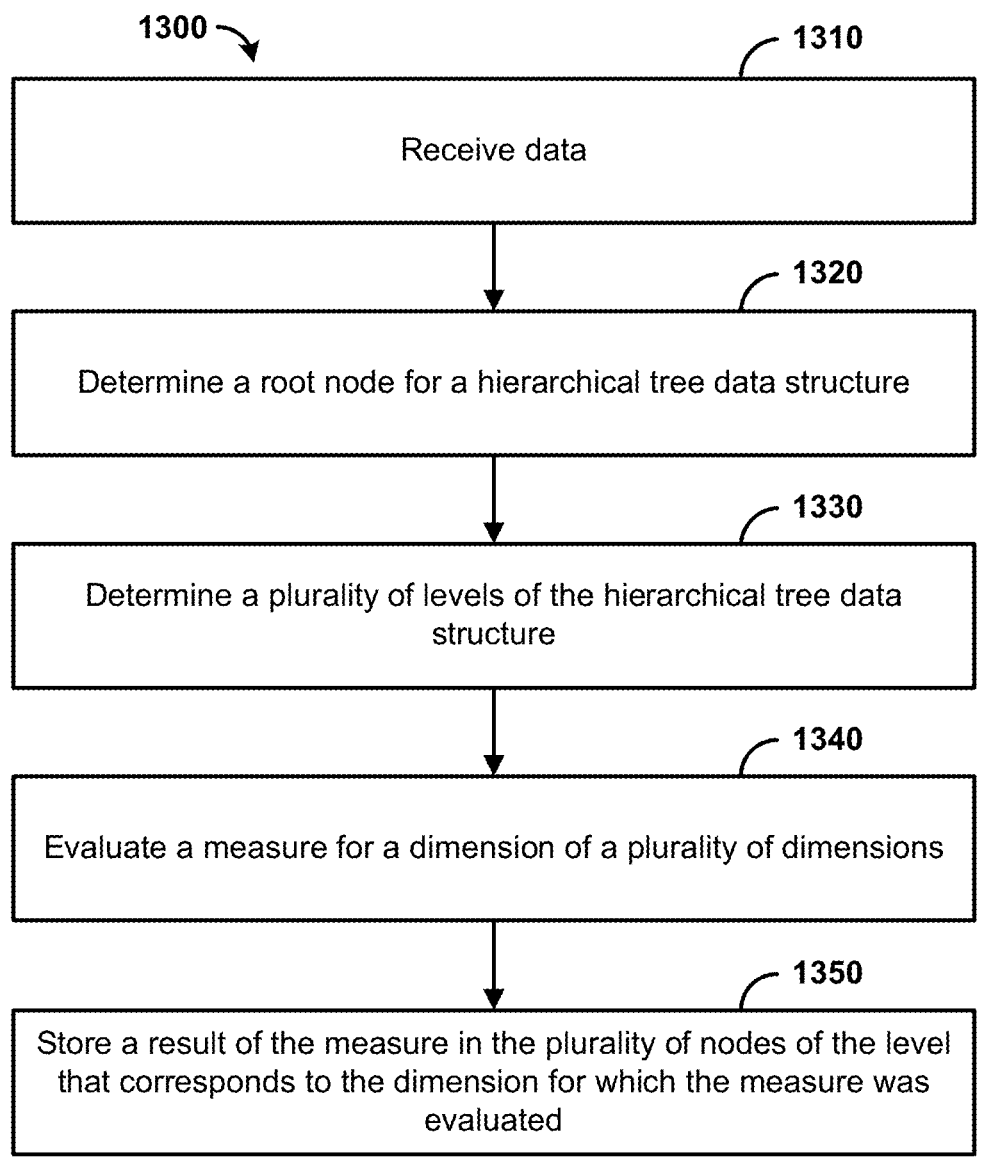
FIG. 13 is a flowchart illustrating an example method.

In an aspect, illustrated in FIG. 13 provided is a method 1300 for generating and using a hierarchical tree data structure. At step 1310, data may be received (e.g., at a computing device) from a database. The data may comprise a plurality of tables of data, and each table may include a plurality of dimensions and a plurality of values for each of the plurality of dimensions. The plurality of dimensions may be, for example, various data element types within a table of data. Each of the plurality of dimensions may be associated with a header row in the table that identifies the associated data element type. At step 1320, a root node for a hierarchical tree data structure may be determined. The root node may be a first node of the hierarchical tree data structure. For example, the root node may a node within the hierarchical tree data structure that has one or more child nodes but no parent node. At step 1330, a plurality of levels of the hierarchical tree data structure may be determined. One level of the plurality of levels may be connected to the root node. Each level of the plurality of levels may correspond to a respective dimension of the plurality of dimensions, and each level of the plurality of levels may comprise a plurality of nodes corresponding to the respective dimension of the plurality of dimensions. Each level of the plurality of levels may be connected to a higher level of the plurality of levels. Each level of the plurality of levels may also be connected to a lower level of the plurality of levels may when such a lower level exists.

At step 1340, a measure for a dimension of the plurality of dimensions may be evaluated. The measure may be evaluated based on the plurality of nodes of the level that corresponds to the dimension for which the measure was evaluated. The measure may be evaluated based on all preceding connected nodes. Evaluating a measure for a dimension of the plurality of dimensions may comprise evaluating at least one measure for each dimension of the plurality of dimensions. Evaluating a measure for a dimension of the plurality of dimensions may comprise evaluating a plurality of measures for a dimension of the plurality of dimensions.

At step 1350, a result of the evaluated measure in the plurality of nodes of the level that corresponds to the dimension for which the measure was evaluated may be stored (e.g., in a memory of the computing device). Each result of the at least one measures in the plurality of nodes of the level that corresponds to the dimension for which the at least one measure was evaluated may be stored. Storing a result of a measure in the plurality of nodes of the level that corresponds to the dimension of the plurality of dimensions can comprise storing a plurality of results of the plurality of measures in the plurality of nodes of the level that corresponds to the dimension for which the plurality of measures was evaluated.

The method 1300 can further comprise generating, based on the hierarchical tree data structure, a chart. The chart may be generated based on receiving a request to generate a trellis chart. The request may include at least two dimensions, each identifying a level of the plurality of levels associated with each of the at least two dimensions. For each level identified by the request, a measure associated with the request may be evaluated. The trellis chart may be generated based on a summation of one or more results for each identified level.

The received request may be indicative of a request to generate a first chart within a second chart. The received request may indicate a plurality of dimensions. Based on the plurality of dimensions, the hierarchical tree data structure may be split into a first tree and a second tree. The first chart may be generated based on the first tree, and the second chart may be generated based on the second tree. The second chart may share a context of the first chart. The context may include one or more tuples, each defined by one or more dimensions and/or evaluations of measures for nodes associated with the one or more dimensions. Generating each of the first chart and the second chart may include generating at least one of a box plot or a scatter matrix. The generated at least one box plot or scatter matrix may be associated with a respective one, or both, of the first chart or the second chart. A background of the scatter matrix may include one or more colors to differentiate between entries within the scatter matrix that have a positive correlation and entries within the scatter matrix that have a negative correlation.

Figure 14:
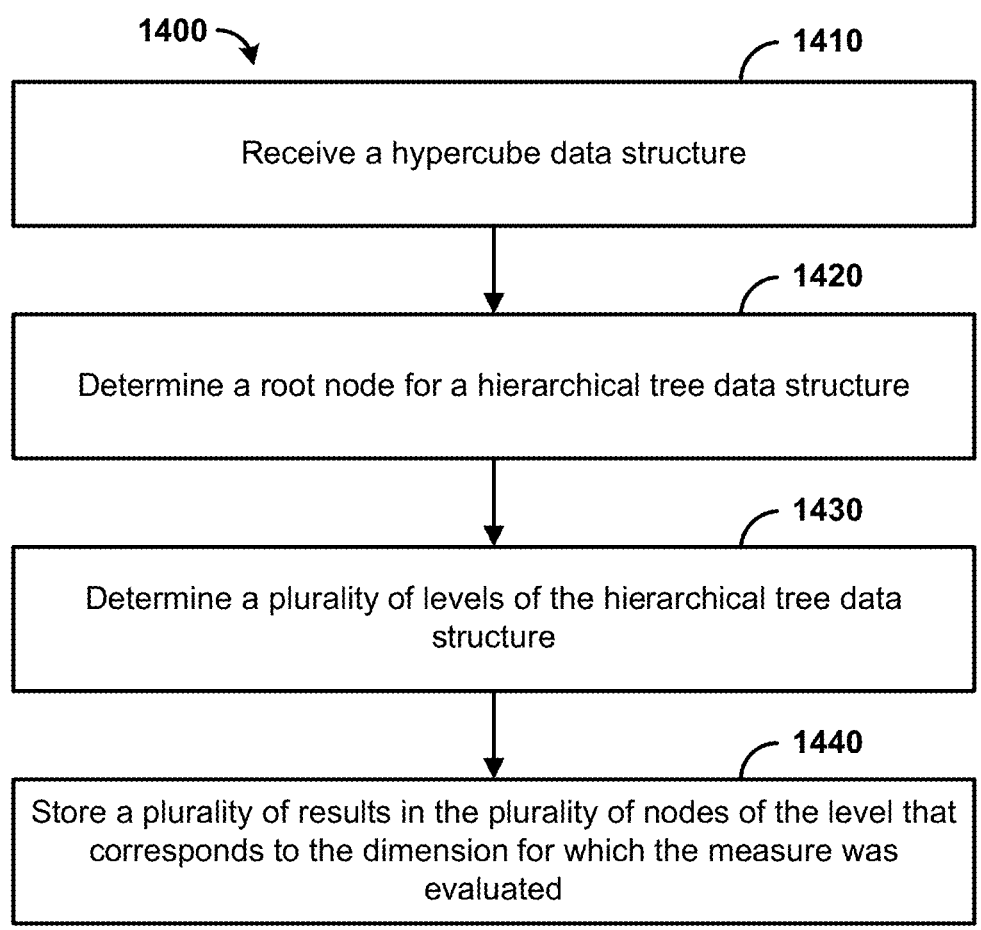
FIG. 14 is a flowchart illustrating an example method.

In an aspect, illustrated in FIG. 14 provided is a method 1400 for generating and using a hierarchical tree data structure. At step 1410, a hypercube data structure may be received by a computing device. The hypercube data structure may be a multidimensional cube (e.g., as shown in non-binary notation in Table 6 of FIG. 4). The hypercube data structure may include a plurality of tables of data, and each table may include a plurality of dimensions. The plurality of dimensions may be, for example, various data element types within a table of data. Each of the plurality of dimensions may be associated with a header row in the table that identifies the associated data element type. The hypercube data structure may include a plurality of values for each of the plurality of dimensions and a plurality of results of measures evaluated on one or more of the plurality of dimensions.

Each measure may be evaluated based on a plurality of nodes of a level of a hierarchical tree data structure that corresponds to a dimension for which the measure was evaluated. Evaluating a measure for a dimension of the plurality of dimensions may comprise evaluating at least one measure for each dimension of the plurality of dimensions. Evaluating a measure for a dimension of the plurality of dimensions may comprise evaluating a plurality of measures for a dimension of the plurality of dimensions. At step 1420, a root node for the hierarchical tree data structure may be determined. The root node may be a first node of the hierarchical tree data structure. For example, the root node may a node within the hierarchical tree data structure that has one or more child nodes but no parent node.

At step 1430 a plurality of levels of the hierarchical tree data structure may be determined. One level of the plurality of levels may be connected to the root node. Each level of the plurality of levels may correspond to a respective dimension of the plurality of dimensions of the plurality of levels may correspond to a respective dimension of the plurality of dimensions, and each level of the plurality of levels may comprise a plurality of nodes corresponding to the respective dimension of the plurality of dimensions. Each level of the plurality of levels may be connected to at least one other level. Each level may have a plurality of nodes corresponding to the respective dimension of the plurality of dimensions.

At step 1440, the plurality of results in the plurality of nodes of the level that corresponds to the dimension for which the measure was evaluated may be stored (e.g., in a memory of the computing device). Storing a result of a measure in the plurality of nodes of the level that corresponds to the dimension of the plurality of dimensions can comprise storing each result of the at least one measures in the plurality of nodes of the level that corresponds to the dimension for which the at least one measure was evaluated. Storing a result of the measure in the plurality of nodes of the level that corresponds to the dimension of the plurality of dimensions can comprise storing a plurality of results of the plurality of measures in the plurality of nodes of the level that corresponds to the dimension for which the plurality of measures was evaluated.

The method 1400 can further comprise generating, based on the hierarchical tree data structure, a chart. The chart may be generated based on receiving a request to generate a trellis chart. The request may include at least two dimensions, each identifying a level of the plurality of levels associated with each of the at least two dimensions. For each level identified by the request, a measure associated with the request may be evaluated. The trellis chart may be generated based on a summation of one or more results for each identified level.

The received request may be indicative of a request to generate a first chart within a second chart. The received request may indicate a plurality of dimensions. Based on the plurality of dimensions, the hierarchical tree data structure may be split into a first tree and a second tree. The first chart may be generated based on the first tree, and the second chart may be generated based on the second tree. The second chart may share a context of the first chart. The context may include one or more tuples, each defined by one or more dimensions and/or evaluations of measures for nodes associated with the one or more dimensions. Generating each of the first chart and the second chart may include generating at least one of a box plot or a scatter matrix. The generated at least one box plot or scatter matrix may be associated with a respective one, or both, of the first chart or the second chart. A background of the scatter matrix may include one or more colors to differentiate between entries within the scatter matrix that have a positive correlation and entries within the scatter matrix that have a negative correlation.

Figure 15:
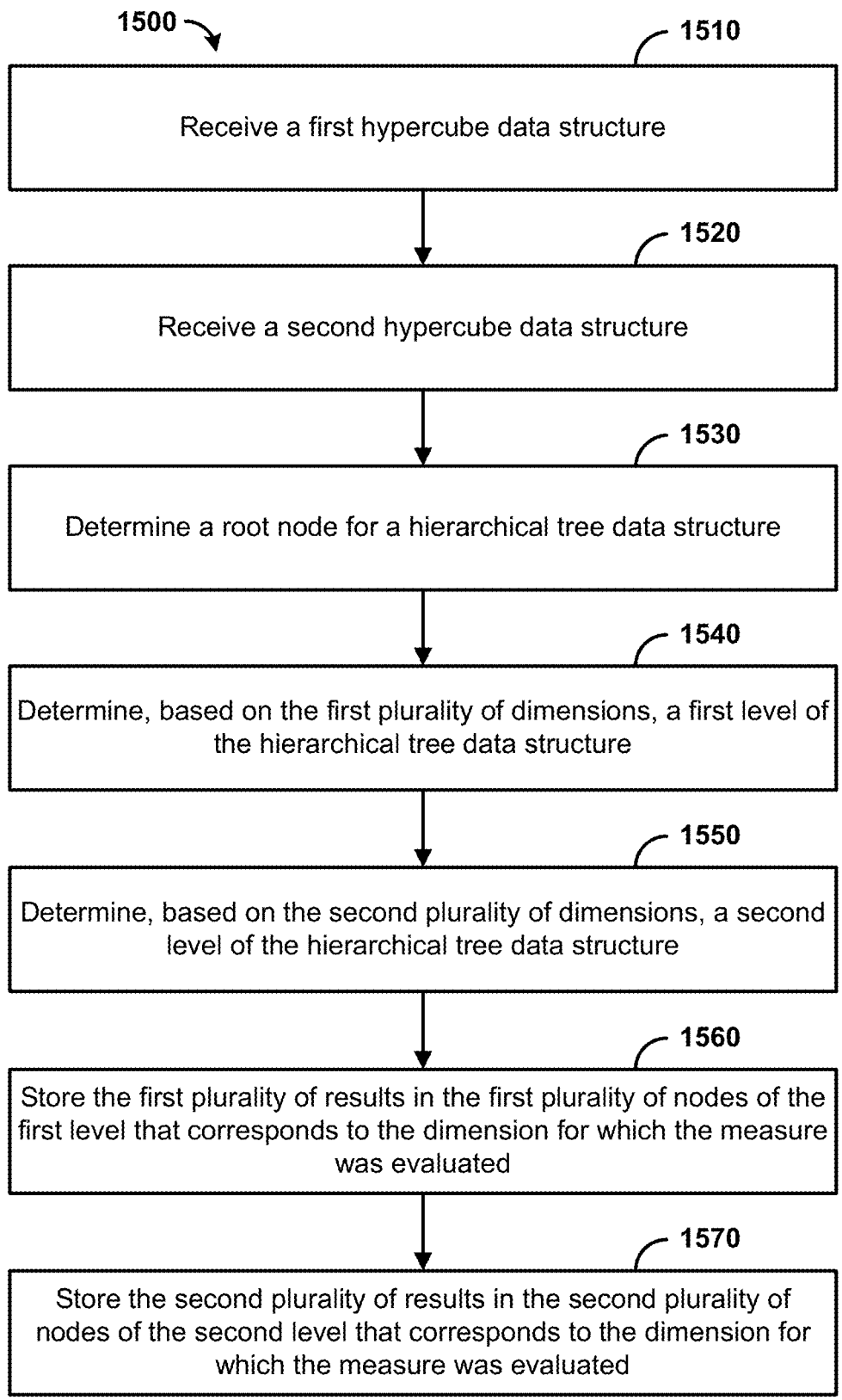
FIG. 15 is a flowchart illustrating another example method.

In an aspect, illustrated in FIG. 15 provided is a method 1500 for generating and using a hierarchical tree data structure. At step 1510 a first hypercube data structure may be received by a computing device. The first hypercube data structure may be a multidimensional cube (e.g., as shown in non-binary notation in Table 6 of FIG. 4). The first hypercube data structure may include a plurality of tables of data, and each table may include a first plurality of dimensions. The plurality of dimensions may be, for example, various data element types within a table of data. Each of the plurality of dimensions may be associated with a header row in the table that identifies the associated data element type. The first hypercube data structure may include a first plurality of values for each of the first plurality of dimensions, and a first plurality of results of measures evaluated on one or more of the first plurality of dimensions.

At step 1520, a second hypercube data structure may be received by the computing device. The second hypercube data structure may include a second plurality of dimensions that include the first plurality of dimensions and an additional dimension. The second hypercube data structure may include a second plurality of values for each of the second plurality of dimensions, and a second plurality of results of measures evaluated on one or more of the second plurality of dimensions. At step 1530 a root node for a hierarchical tree data structure may be determined. The root node may be a first node of the hierarchical tree data structure. For example, the root node may a node within the hierarchical tree data structure that has one or more child nodes but no parent node.

At step 1540, based on the first plurality of dimensions, a first level of the hierarchical tree data structure may be determined. The first level may be connected to the root node, and the first level may include a first plurality of nodes corresponding to a respective dimension of the first plurality of dimensions. At step 1550, a second level of the hierarchical tree data structure may be determined. The second level of the hierarchical tree data structure may be determined based on the second plurality of dimensions. The second level is connected to the first level. The second level may include a second plurality of nodes corresponding to a respective dimension of the second plurality of dimensions.

At step 1560, the first plurality of results in the first plurality of nodes of the first level that corresponds to the dimension for which the measure was evaluated may be stored (e.g., in a memory of the computing device). At step 1570, the second plurality of results in the second plurality of nodes of the second level that corresponds to the dimension for which the measure was evaluated may be stored (e.g., in a memory of the computing device).

The method 1500 can further comprise generating, based on the hierarchical tree data structure, a chart. The chart may be generated based on receiving a request to generate a trellis chart. The request may include at least two dimensions, each identifying a level of the plurality of levels associated with each of the at least two dimensions. For each level identified by the request, a measure associated with the request may be evaluated. The trellis chart may be generated based on a summation of one or more results for each identified level.

The received request may be indicative of a request to generate a first chart within a second chart. The received request may indicate a plurality of dimensions. Based on the plurality of dimensions, the hierarchical tree data structure may be split into a first tree and a second tree. The first chart may be generated based on the first tree, and the second chart may be generated based on the second tree. The second chart may share a context of the first chart. The context may include one or more tuples, each defined by one or more dimensions and/or evaluations of measures for nodes associated with the one or more dimensions. Generating each of the first chart and the second chart may include generating at least one of a box plot or a scatter matrix. The generated at least one box plot or scatter matrix may be associated with a respective one, or both, of the first chart or the second chart. A background of the scatter matrix may include one or more colors to differentiate between entries within the scatter matrix that have a positive correlation and entries within the scatter matrix that have a negative correlation.

Figure 16:
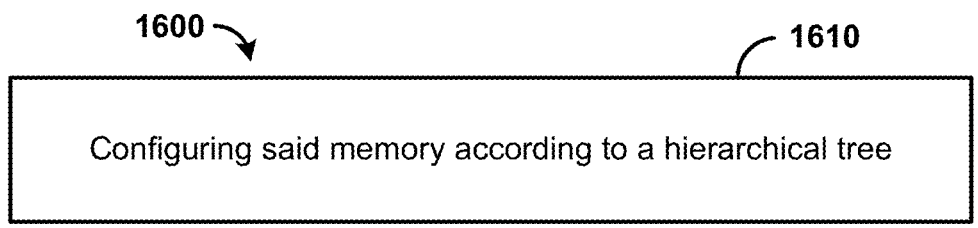
FIG. 16 is a flowchart illustrating another example method.

In an aspect, illustrated in FIG. 16 provided is a method 1600 for storing and retrieving data in a computer memory when generating and using a hierarchical tree data structure. At step 1610, the memory may be configured according to a hierarchical tree. The hierarchical tree may include a root node for a hierarchical tree data structure. The root node may be a first node of the hierarchical tree. For example, the root node may a node within the hierarchical tree that has one or more child nodes but no parent node. The hierarchical tree may include a plurality of levels of the hierarchical tree data structure. One level of the plurality of levels may be connected to the root node. Each level of the plurality of levels may correspond to a respective dimension of the plurality of dimensions, and each level of the plurality of levels may comprise a plurality of nodes corresponding to the respective dimension of the plurality of dimensions. Each level may be connected to at least one other level of the plurality of levels. Each level may include a plurality of nodes corresponding to the respective dimension of the plurality of dimensions, and a plurality of results of measures evaluated on one or more of the plurality of dimensions stored in the plurality of nodes of the level that corresponds to the dimension for which the measure was evaluated. Each measure may be evaluated based on a plurality of nodes of a level that corresponds to a dimension for which the measure was evaluated. The measure may be evaluated based on all preceding connected nodes. Evaluating a measure for a dimension of the plurality of dimensions may comprise evaluating at least one measure for each dimension of the plurality of dimensions. Evaluating a measure for a dimension of the plurality of dimensions may comprise evaluating a plurality of measures for a dimension of the plurality of dimensions. Each result of the plurality of results may be stored (e.g., in a memory of the computing device). Storing a result of a measure in the plurality of nodes of the level that corresponds to the dimension of the plurality of dimensions can comprise storing a plurality of results of the plurality of measures in the plurality of nodes of the level that corresponds to the dimension for which the plurality of measures was evaluated.

Figure 17:
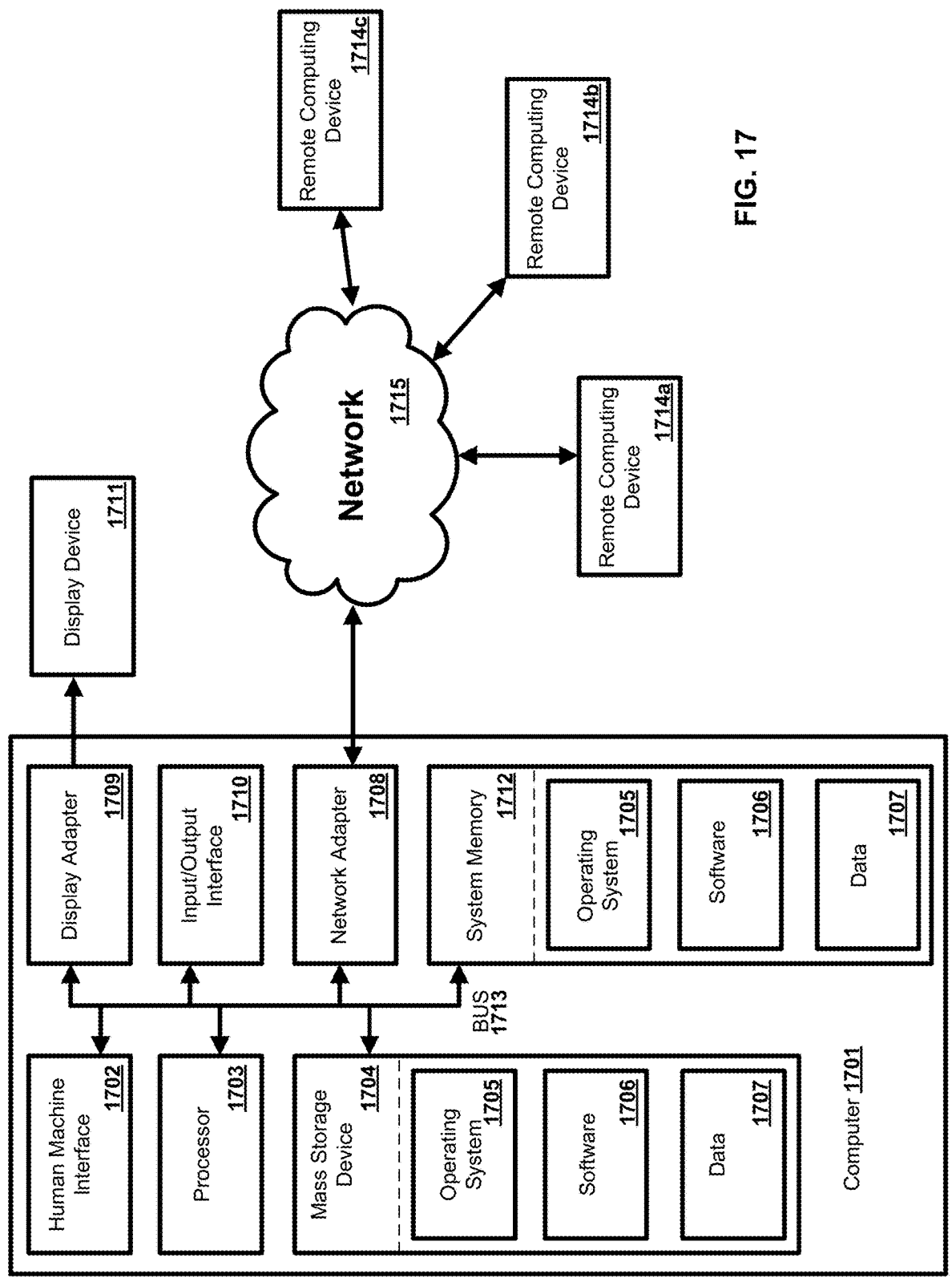
FIG. 17 is an exemplary operating environment for performing the disclosed methods.

In an exemplary aspect, the methods and systems can be implemented on a computer 1701 as illustrated in FIG. 17 and described below. Similarly, the methods and systems disclosed can utilize one or more computers to perform one or more functions in one or more locations. FIG. 17 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1701. The components of the computer 1701 can comprise, but are not limited to, one or more processors 1703, a system memory 1712, and a system bus 1713 that couples various system components including the one or more processors 1703 to the system memory 1712. The system can utilize parallel computing.

The system bus 1713 represents one or more of several possible types of bus structures, including a memory bus or memory controller, a peripheral bus, an accelerated graphics port, or local bus using any of a variety of bus architectures. The bus 1713, and all buses specified in this description can also be implemented over a wired or wireless network connection and each of the subsystems, including the one or more processors 1703, a mass storage device 1704, an operating system 1705, associative data indexing engine software 1706, data 1707, a network adapter 1708, the system memory 1712, an Input/Output Interface 1710, a display adapter 1709, a display device 1711, and a human machine interface 1702, can be contained within one or more remote computing devices 1714*a,b,c* at physically separate locations, connected through buses of this form, in effect implementing a fully distributed system.

The computer 1701 typically comprises a variety of computer readable media. Exemplary readable media can be any available media that is accessible by the computer 1701 and comprises, for example and not meant to be limiting, both volatile and non-volatile media, removable and non-removable media. The system memory 1712 comprises computer readable media in the form of volatile memory, such as random access memory (RAM), and/or non-volatile memory, such as read only memory (ROM). The system memory 1712 typically contains data such as the data 1707 and/or program modules such as the operating system 1705 and the associative data indexing engine software 1706 that are immediately accessible to and/or are presently operated on by the one or more processors 1703.

In another aspect, the computer 1701 can also comprise other removable/non-removable, volatile/non-volatile computer storage media. By way of example, FIG. 17 illustrates the mass storage device 1704 which can provide non-volatile storage of computer code, computer readable instructions, data structures, program modules, and other data for the computer 1701. For example and not meant to be limiting, the mass storage device 1704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1704, including by way of example, the operating system 1705 and the associative data indexing engine software 1706. Each of the operating system 1705 and the associative data indexing engine software 1706 (or some combination thereof) can comprise elements of the programming and the associative data indexing engine software 1706. The data 1707 can also be stored on the mass storage device 1704. The data 1707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. The data 1707 can comprise one or more hierarchical tree data structures and/or one or more multidimensional cubes (e.g., hypercubes).

In an aspect, the associative data indexing engine software 1706 can comprise one or more of a script engine, a logical inference engine, a calculation engine, an extension engine, and/or a rendering engine. In an aspect, the associative data indexing engine software 1706 can comprise an external engine and/or an interface to the external engine.

In another aspect, the user can enter commands and information into the computer 1701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1703 via the human machine interface 1702 that is coupled to the system bus 1713, but can be connected by other interface and bus structures, such as a parallel port, game port, an IEEE 1394 Port (also known as a Firewire port), a serial port, or a universal serial bus (USB).

In yet another aspect, the display device 1711 can also be connected to the system bus 1713 via an interface, such as the display adapter 1709. It is contemplated that the computer 1701 can have more than one display adapter 1709 and the computer 1701 can have more than one display device 1711. For example, the display device 1711 can be a monitor, an LCD (Liquid Crystal Display), or a projector. In addition to the display device 1711, other output peripheral devices can comprise components such as speakers (not shown) and a printer (not shown) which can be connected to the computer 1701 via the Input/Output Interface 1710. Any step and/or result of the methods can be output in any form to an output device. Such output can be any form of visual representation, including, but not limited to, textual, graphical, animation, audio, tactile, and the like. The display device 1711 and computer 1701 can be part of one device, or separate devices.

The computer 1701 can operate in a networked environment using logical connections to one or more remote computing devices 1714*a,b,c*. By way of example, a remote computing device can be a personal computer, portable computer, smartphone, a server, a router, a network computer, a peer device or other common network node, and so on. Logical connections between the computer 1701 and a remote computing device 1714*a,b,c* can be made via a network 1715, such as a local area network (LAN) and/or a general wide area network (WAN). Such network connections can be through the network adapter 1708. The network adapter 1708 can be implemented in both wired and wireless environments. Such networking environments are conventional and commonplace in dwellings, offices, enterprise-wide computer networks, intranets, and the Internet. In an aspect, one or more of the remote computing devices 1714*a,b,c* can comprise an external engine and/or an interface to the external engine.

For purposes of illustration, application programs and other executable program components such as the operating system 1705 are illustrated herein as discrete blocks, although it is recognized that such programs and components reside at various times in different storage components of the computing device 1701, and are executed by the one or more processors 1703 of the computer. An implementation of the associative data indexing engine software 1706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
   receiving data comprising a plurality of dimensions and a plurality of values for each of the plurality of dimensions;
   determining a plurality of levels of a hierarchical tree data structure, wherein one of the plurality of levels is connected to a root node of the hierarchical tree data structure, wherein each of the plurality of levels corresponds to a respective dimension of the plurality of dimensions, wherein each of the plurality of levels is connected to at least one other level of the plurality of levels, and wherein each of the plurality of levels comprises a plurality of nodes corresponding to the respective dimension of the plurality of dimensions;
   identifying, based on a request to generate a trellis chart, each of the plurality of levels associated with each of at least two dimensions of the plurality of dimensions associated with the request;
   evaluating a measure for each dimension of the at least two dimensions based on the plurality of nodes corresponding to the level of the plurality of levels that corresponds to each of the at least two dimensions and all preceding connected nodes in the hierarchical tree data structure;
   storing a result of the measure for each dimension of the at least two dimensions in the plurality of nodes corresponding to the each of the at least two dimensions; and
   generating, based on the result of the measure for each of the at least two dimensions, the trellis chart.

2. The method of claim 1, further comprising: evaluating at least one measure for each dimension of the plurality of dimensions.

3. The method of claim 1, wherein the data comprises a hypercube data structure.

4. The method of claim 1, wherein evaluating the measure for each dimension of the at least two dimensions comprises evaluating a plurality of measures for each of the at least two dimensions.

5. The method of claim 4, wherein storing the result of the measure for each dimension of the at least two dimensions comprises storing a plurality of results of the plurality of measures.

6. The method of claim 1, further comprising
   receiving a request to generate a first chart within a second chart, wherein the request comprises one or more of the plurality of dimensions.

7. The method of claim 6, further comprising:
   splitting, based on the one or more of the plurality of dimensions, the hierarchical tree data structure into a first tree and a second tree.

8. The method of claim 7, further comprising:
   generating, based on the first tree, the first chart; and
   generating, based on the second tree, the second chart, wherein the second chart shares a context of the first chart.

9. The method of claim 1, further comprising generating, based on the trellis chart, at least one of a box plot or a scatter matrix, wherein a background of the scatter matrix is colored based on a positive correlation or a negative correlation.

10. A method comprising:
    receiving a hypercube data structure comprising a plurality of dimensions, a plurality of values for each of the plurality of dimensions, and a plurality of results of measures evaluated on one or more of the plurality of dimensions;

determining a plurality of levels of a hierarchical tree data structure, wherein one level of the plurality of levels is connected to a root node of the hierarchical tree data structure, wherein each of the plurality of levels corresponds to a respective dimension of the plurality of dimensions, wherein each of the plurality of levels is connected to at least one other level of the plurality of levels, and wherein each of the plurality of levels comprises a plurality of nodes corresponding to the respective dimension of the plurality of dimensions;

storing the plurality of results of measures in the plurality of nodes of the level of the plurality of levels that corresponds to the respective dimension of the plurality of dimensions;

receiving a request to generate a first chart within a second chart, wherein the request comprises the plurality of dimensions;

splitting, based on the plurality of dimensions, the hierarchical tree data structure into a first tree and a second tree;

generating, based on the first tree, the first chart; and generating, based on the second tree, the second chart, wherein the second chart shares a context of the first chart.

11. The method of claim 10, further comprising:

receiving a request to generate a trellis chart, wherein the request comprises at least two dimensions of the plurality of dimensions.

12. The method of claim 11, further comprising:

identifying a level of the plurality of levels associated with each of the at least two dimensions.

13. The method of claim 12 further comprising:

evaluating, for each level of the plurality of levels associated with each of the at least two dimensions, a measure associated with the request; and generating, based on a sum of one or more results for each level of the plurality of levels associated with each of the at least two dimensions, the trellis chart.

14. The method of claim 10, further comprising:

generating at least one of a box plot or a scatter matrix, wherein a background of the scatter matrix comprises a color based on a positive correlation or a negative correlation.

15. A method comprising:

receiving a first hypercube data structure comprising a first plurality of dimensions, a first plurality of values for each of the first plurality of dimensions, and a first plurality of results of measures evaluated on one or more of the first plurality of dimensions;

receiving a second hypercube data structure comprising a second plurality of dimensions that include the first plurality of dimensions and an additional dimension, a second plurality of values for each of the second plurality of dimensions, and a second plurality of results of measures evaluated on one or more of the second plurality of dimensions;

determining, based on the first plurality of dimensions, a first level of a hierarchical tree data structure, wherein the first level is connected to a root node of the hierarchical tree data structure, and wherein the first level comprises a first plurality of nodes corresponding to a respective dimension of the first plurality of dimensions;

determining, based on the second plurality of dimensions, a second level of the hierarchical tree data structure, wherein the second level is connected to the first level, and wherein the second level comprises a second plurality of nodes corresponding to a respective dimension of the second plurality of dimensions;

storing the first plurality of results of measures in the first plurality of nodes of the first level that corresponds to the respective dimension of the first plurality of dimensions;

storing the second plurality of results of measures in the second plurality of nodes of the second level that corresponds to the respective dimension of the second plurality of dimensions; and generating, based on the stored first plurality of results of measures and the stored second plurality of results of measures, a chart.

16. The method of claim 15, further comprising:

receiving a request to generate a trellis chart, wherein the request comprises at least one first dimension of the first plurality of dimensions and at least one second dimension of the second plurality of dimensions.

17. The method of claim 16 further comprising:

generating at least one of a box plot or a scatter matrix, wherein a background of the scatter matrix comprises a color based on a positive or a negative correlation.

18. The method of claim 16, further comprising:

evaluating, based on the at least one first dimension and the at least one second dimension, for each corresponding level of the hierarchical tree data structure, a measure associated with the request; and generating, based on a sum of one or more results for each corresponding level of the hierarchical tree data structure, the trellis chart.

19. The method of claim 16 further comprising:

receiving a request to generate a first chart within a second chart, wherein the request comprises a plurality of dimensions;

splitting, based on the plurality of dimensions, the hierarchical tree data structure into a first tree and a second tree;

generating, based on the first tree, the first chart; and generating, based on the second tree, the second chart, wherein the second chart shares a context of the first chart.

20. A non-transitory computer readable medium comprises processor-executable instructions that, when executed by a processor of a computing device, cause the computing device to:

receive data comprising a plurality of dimensions and a plurality of values for each of the plurality of dimensions;

determine a plurality of levels of a hierarchical tree data structure, wherein one of the plurality of levels is connected to a root node of the hierarchical tree data structure, wherein each of the plurality of levels corresponds to a respective dimension of the plurality of dimensions, wherein each of the plurality of levels is connected to at least one other level of the plurality of levels, and wherein each of the plurality of levels comprises a plurality of nodes corresponding to the respective dimension of the plurality of dimensions;

identify, based on a request to generate a trellis chart, each of the plurality of levels associated with each of at least two dimensions of the plurality of dimensions associated with the request;

evaluate a measure for each dimension of the at least two dimensions based on the plurality of nodes corresponding to the level of the plurality of levels that corresponds to each of the at least two dimensions and all preceding connected nodes in the hierarchical tree data structure;

store a result of the measure for each dimension of the at least two dimensions in the plurality of nodes corresponding to the each of the at least two dimensions; and generate, based on the result of the measure for each of the at least two dimensions, the trellis chart.

* * * * *